(12) United States Patent
Takeuchi

(10) Patent No.: US 9,824,585 B2
(45) Date of Patent: Nov. 21, 2017

(54) COLLISION AVOIDANCE APPARATUS

(71) Applicant: TOYOTA JIDOSHA KABUSHIKI KAISHA, Toyota-shi, Aichi-ken (JP)

(72) Inventor: Koji Takeuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/013,415

(22) Filed: Feb. 2, 2016

(65) Prior Publication Data

US 2016/0240084 A1 Aug. 18, 2016

(30) Foreign Application Priority Data

Feb. 16, 2015 (JP) .................................. 2015-027954

(51) Int. Cl.
*G08G 1/16* (2006.01)
*B60Q 5/00* (2006.01)
*B60T 7/22* (2006.01)
*B60T 17/22* (2006.01)

(52) U.S. Cl.
CPC ............. *G08G 1/165* (2013.01); *B60Q 5/006* (2013.01); *B60T 7/22* (2013.01); *B60T 17/22* (2013.01); *G08G 1/166* (2013.01); *B60T 2201/022* (2013.01)

(58) Field of Classification Search
CPC .. G08G 1/165; G08G 1/166; B60T 2201/022; B60T 17/22; B60T 7/22; B60Q 5/006
USPC .......................................................... 701/70
See application file for complete search history.

(56) References Cited

U.S. PATENT DOCUMENTS

| 7,124,027 | B1* | 10/2006 | Ernst, Jr. | ............... | B60W 30/09 340/435 |
| 7,565,234 | B2 | 7/2009 | Noda et al. | | |
| 8,762,043 | B2 | 6/2014 | Eidehall et al. | | |
| 9,374,562 | B2* | 6/2016 | Trombley | ............... | B60R 1/003 |
| 2002/0022927 | A1* | 2/2002 | Lemelson | ............... | G01S 19/11 701/301 |
| 2007/0032914 | A1* | 2/2007 | Kondoh | ................ | B60W 50/16 701/1 |

(Continued)

FOREIGN PATENT DOCUMENTS

| JP | H06-1221 A | 1/1994 |
| JP | 2004-058801 A | 2/2004 |

(Continued)

*Primary Examiner* — Atul Trivedi
(74) *Attorney, Agent, or Firm* — Oliff PLC

(57) ABSTRACT

A collision avoidance apparatus includes an obstacle detection unit to detect an obstacle ahead of a vehicle; an approaching object detection unit to detect an approaching object approaching the vehicle from behind the vehicle; and an electronic control unit to calculate a collision time until the vehicle collides with the obstacle, based on the distance and relative speed of the obstacle, and starts a drive support to avoid a collision with the obstacle when the vehicle speed is a lower limit speed or greater, and the collision time is a threshold or less. When there is a likelihood for the object to collide with the vehicle from behind the vehicle, the electronic control unit lowers the lower limit speed, and/or starts drive support when the collision time is the threshold or less, even when the vehicle speed is less than the lower limit speed.

8 Claims, 10 Drawing Sheets

(56) References Cited

U.S. PATENT DOCUMENTS

| | | | |
|---|---|---|---|
| 2007/0080825 A1* | 4/2007 | Shiller | B60R 21/013 |
| | | | 340/903 |
| 2013/0024075 A1 | 1/2013 | Zagorski et al. | |
| 2014/0350813 A1 | 11/2014 | Jeon et al. | |
| 2014/0358392 A1* | 12/2014 | Shimizu | G08G 1/166 |
| | | | 701/70 |
| 2015/0274162 A1* | 10/2015 | Sato | B60W 10/04 |
| | | | 701/23 |
| 2016/0280134 A1* | 9/2016 | Miura | B60Q 9/008 |
| 2017/0057498 A1* | 3/2017 | Katoh | B60W 10/18 |

FOREIGN PATENT DOCUMENTS

| | | |
|---|---|---|
| JP | 2007-048246 A | 2/2007 |
| JP | 2010-282350 A | 12/2010 |
| JP | 2011-227587 A | 11/2011 |

* cited by examiner

COLLISION AVOIDANCE APPARATUS

CROSS REFERENCE TO RELATED APPLICATION

The present application is based on and claims the benefit of priority of Japanese Priority Application No. 2015-027954, filed on Feb. 16, 2015, the entire contents of which are hereby incorporated by reference.

FIELD

The disclosures herein generally relate to a collision avoidance apparatus to avoid a collision with an object ahead of a vehicle.

BACKGROUND

Conventionally, a technology has been known that determines a likelihood of a collision with an obstacle ahead of a vehicle when the vehicle speed of the vehicle is lower than a predetermined vehicle speed, and depending on the determination, inhibits execution of drive support such as issuing an alarm, and braking automatically (for example, Japanese Laid-open Patent Publication No. H6-1221).

This technology makes it possible to suppress a situation where the drive support is frequently executed in a circumstance where the vehicle travels at a comparatively low vehicle speed due to, for example, traffic congestion, and to suppress a sense of discomfort or the like felt by the driver of the vehicle that could be caused by frequent execution of the drive support.

Incidentally, for example, if the vehicle stops or travels at a comparatively low vehicle speed, and a following vehicle collides with the vehicle from behind, there is a likelihood that the vehicle is pushed out by the following vehicle, and suddenly approaches an obstacle positioned ahead. In such a case, it is desirable to have the drive support executed to avoid a collision with the obstacle ahead of the vehicle.

However, if one adopts a configuration in which the drive support is inhibited if the vehicle speed of the vehicle is lower than a predetermined vehicle speed as done by the technology described in Japanese Laid-open Patent Publication No. H6-1221, the drive support may not be executed at an appropriate timing in the above case. Namely, if the vehicle speed of the vehicle is lower than the predetermined vehicle speed when the vehicle is struck from behind, the drive support is not executed until the vehicle speed of the vehicle becomes greater than or equal to the predetermined vehicle speed after the collision from behind. Therefore, there is a likelihood that the drive support is not executed, or executed but the start timing of the drive support is late.

In view of the above problem, it is an object of at least one embodiment to provide a collision avoidance apparatus that executes drive support to avoid a collision with an obstacle ahead of a vehicle, while avoiding frequently executing the drive support in a circumstance where the vehicle travels at a comparatively low vehicle speed, yet is capable of executing the drive support at an appropriate timing if the vehicle is pushed forward to be accelerated, due to a collision in which a following vehicle strikes the vehicle from behind.

SUMMARY

According to an embodiment, a collision avoidance apparatus for a vehicle includes an obstacle detection unit that includes a first sensor to detect an obstacle positioned ahead of a vehicle; an approaching object detection unit that includes a second sensor to detect an approaching object approaching the vehicle from behind the vehicle; and an electronic control unit configured to (i) calculate a collision time until the vehicle collides with the obstacle detected by the first sensor, based on a distance between the vehicle and the obstacle, and a relative speed of the obstacle with respect to the vehicle and (ii) execute a drive support to avoid the collision between the vehicle and the obstacle based on the collision time, and to start the drive support when (1) a vehicle speed of the vehicle is greater than or equal to a predetermined lower limit speed and (2) the collision time is less than or equal to a predetermined threshold. The electronic control unit executes at least one of (a) lowering the lower limit speed when it has been determined, based on an output of the second sensor, that a likelihood exists for the approaching object to collide with the vehicle from behind the vehicle, and (b) starting the drive support when it has been determined that the likelihood exists for the approaching object to collide with the vehicle from behind the vehicle, and the collision time is less than or equal to the predetermined threshold, even when the vehicle speed of the vehicle is less than the predetermined lower limit speed.

According to an embodiment, it is possible to provide a collision avoidance apparatus that executes drive support to avoid a collision with an obstacle head of a vehicle, while avoiding frequently executing the drive support in a circumstance where the vehicle travels at a comparatively low vehicle speed, yet is capable of executing the drive support at an appropriate timing if the vehicle is pushed forward and accelerated, due to a collision in which a following vehicle strikes the vehicle from behind.

DESCRIPTION OF EMBODIMENTS

In the following, embodiments will be described with reference to the drawings.

First Embodiment

Figure 1:
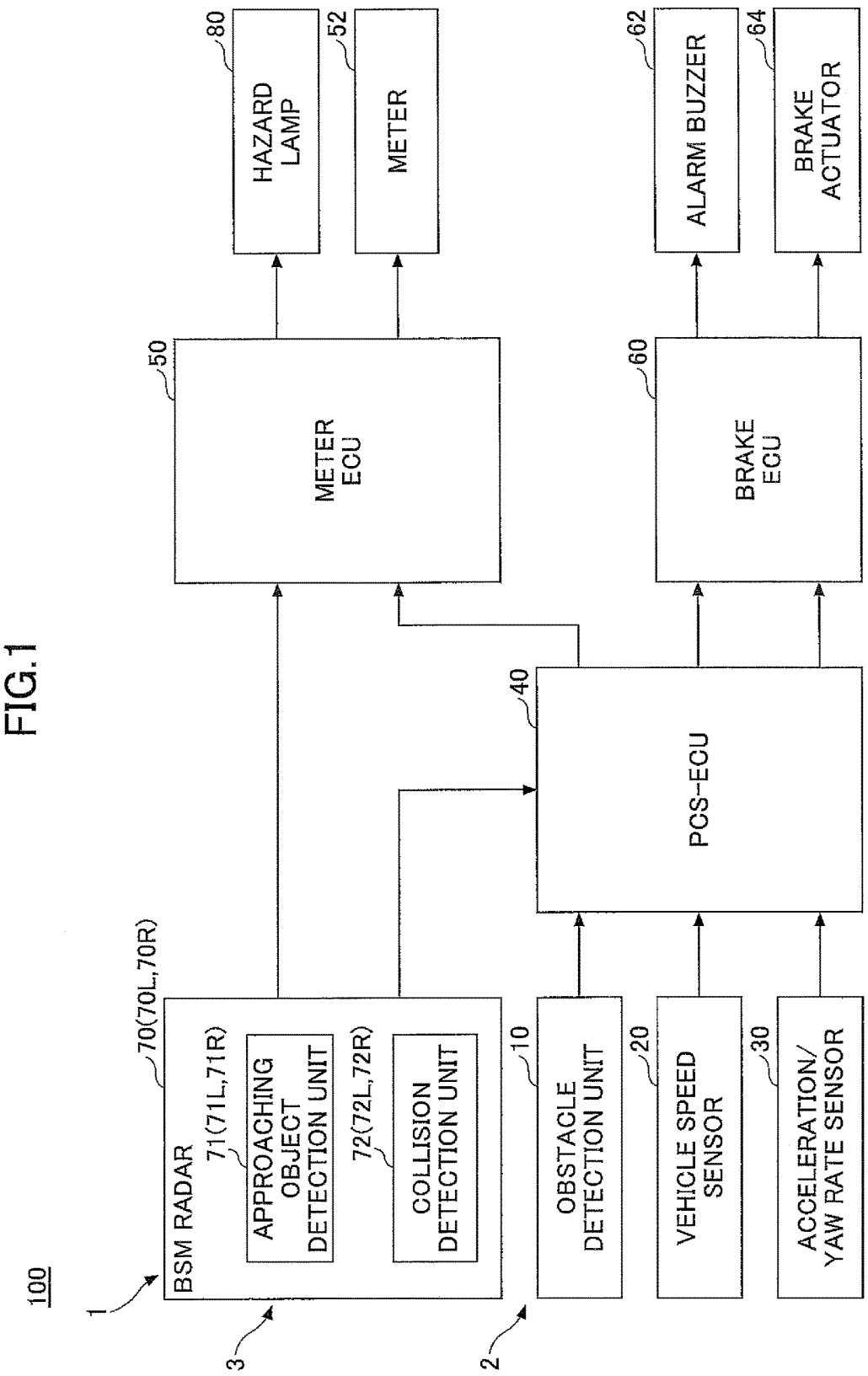
FIG. 1 is a block diagram that illustrates an example of a configuration of a vehicle that includes a collision avoidance apparatus.
Figure 2:
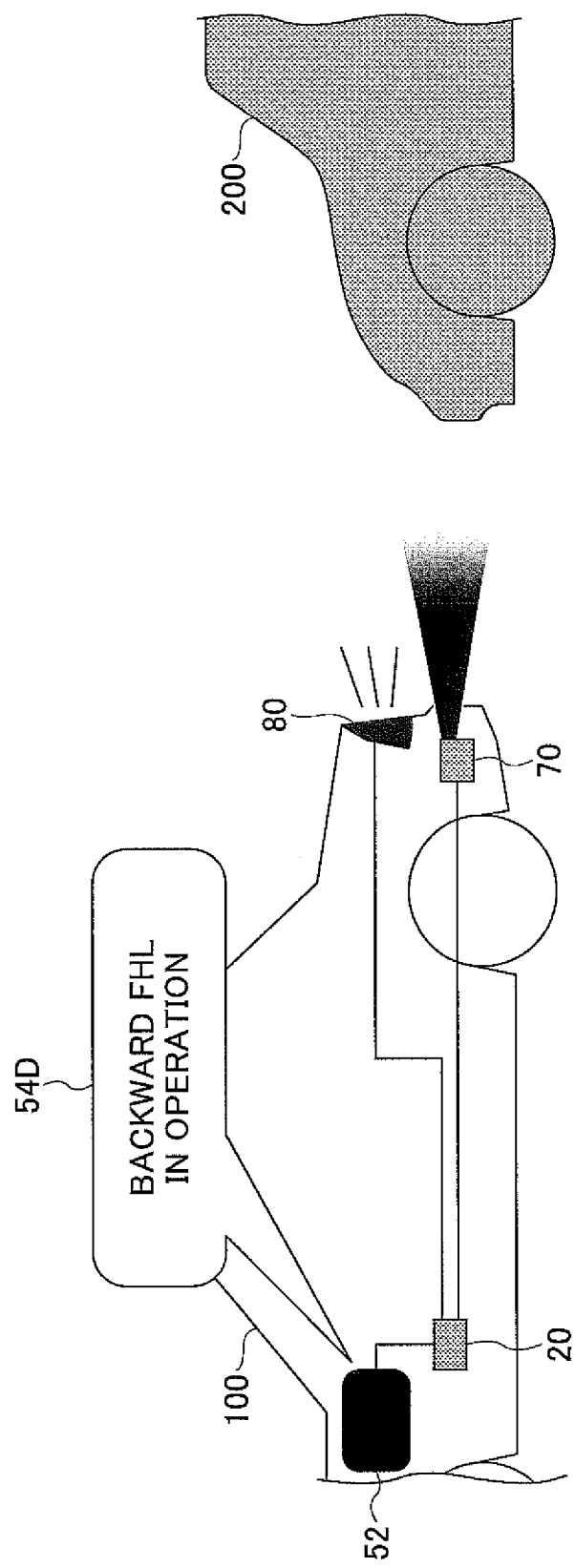
FIG. 2 is a diagram that schematically illustrates an operational aspect of a backward FHL system included in a collision avoidance apparatus.
Figure 3:
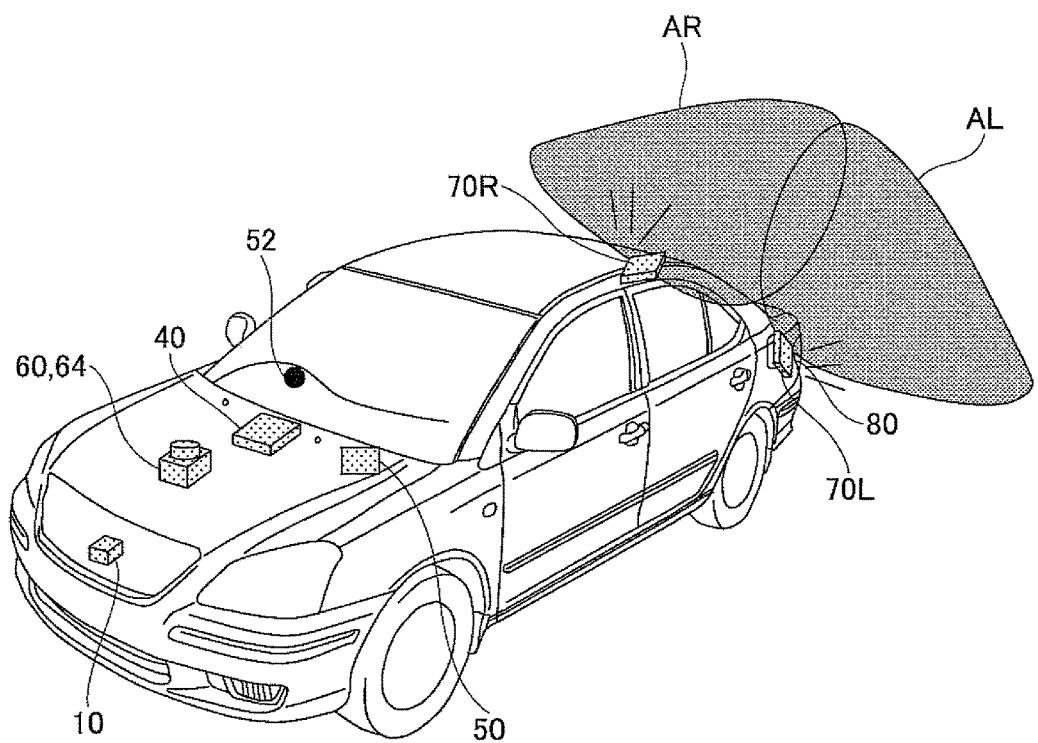
FIG. 3 is a diagram that illustrates an example of an aspect of installation of elements included in a collision avoidance apparatus.

FIGS. 1-3 are diagrams that illustrate a configuration of a collision avoidance apparatus 1 according to a first embodiment. FIG. 1 is a block diagram that illustrates an example of a configuration of a vehicle 100 that includes the collision avoidance apparatus 1. FIG. 2 is a diagram that schematically illustrates an operational aspect of a backward FHL (Flashing Hazard Lamp) system 3 included in the collision avoidance apparatus 1. FIG. 3 is a diagram that illustrates an example of an aspect of installation of elements included in the collision avoidance apparatus 1.

Note that notations about directions, "front", "rear", "left", "right", "up", and "down" designate the front, rear, left, and right, up, and down directions, respectively, with respect to the vehicle 100. Also, the vehicle 100 may be any vehicle such as a vehicle having an engine as the only driving force source, or an electrically driven vehicle (a hybrid vehicle, a range extender vehicle, or an electric vehicle having a motor as the only driving force source).

As illustrated in FIG. 1, the collision avoidance apparatus 1 according to the present embodiment includes a front PCS (Pre-Crash Safety) system 2 and the backward FHL system 3.

The forward PCS system 2 executes drive support (alarming, automatic braking, and the like, which will be described later) to avoid a collision with an obstacle (a preceding vehicle, a pedestrian, a fixed object on a road, etc.) positioned ahead of the vehicle 100. The forward PCS system 2 is configured to include an obstacle detection unit 10, a vehicle speed sensor 20, an acceleration/yaw rate sensor 30, a PCS-ECU (Electronic Control Unit) 40, a meter ECU 50, a meter 52, a brake ECU 60, an alarm buzzer 62, and a brake actuator 64.

The obstacle detection unit 10 is an obstacle detection unit that detects an obstacle (a preceding vehicle, a pedestrian, a fixed object on a road, etc.) ahead of the vehicle 100. Also, the obstacle detection unit 10 is configured to detect the relative position of an obstacle with respect to the vehicle 100 (simply referred to as the "relative position of the obstacle" below), the relative speed of the obstacle (simply referred to as the "relative speed of the obstacle" below), the size of the obstacle (the width in the left and right direction), and the like.

Note that the relative position of an obstacle includes, for example, the distance from the vehicle 100 to the obstacle (simply referred to as the "distance to the obstacle" below), and the direction of the obstacle as viewed from the vehicle 100 (simply referred to as "the obstacle direction" below).

The obstacle detection unit 10 may be a known radar sensor (a millimeter-wave radar, a laser radar, etc.) to detect an obstacle ahead of the vehicle 100, for example, by transmitting a detection wave (a radio wave, laser, etc.) forward from the vehicle 100, and receiving a reflected wave that corresponds to the detection wave. Also, the obstacle detection unit 10 may be a known camera sensor to detect an obstacle ahead of the vehicle 100, by capturing an image ahead of the vehicle 100 by using an imaging element, for example, a CCD (Charge Coupled Device), or a CMOS (Complementary Metal-Oxide Semiconductor), and applying predetermined image processing to the captured image. Also, the obstacle detection unit 10 may be configured to include both a radar sensor and a camera sensor.

Note that the radar sensor may be configured to be built in the vehicle 100, for example, around the center in the left and right direction of the front bumper or in the front grill, and to transmit a detection wave in a predetermined range of angles in the left and right direction, and in the up and down direction around a predetermined axis (optical axis) that extends ahead of the vehicle 100, as the center. Also, the camera sensor may be configured to be built in the vehicle 100, for example, around the center in the left and right direction of an upper part of the front window in the vehicle compartment, and to capture an image in a predetermined range of angles in the left and right direction, and in the up and down direction around an imaging direction that extends ahead of the vehicle 100, as the center. Also, if the obstacle detection unit 10 is configured to include both the radar sensor and the camera sensor, the obstacle detection unit 10 may take advantage of both characteristics (strengths) to generate information that integrates (fuses) the relative position of an obstacle, the relative speed of the obstacle, the obstacle direction, and the like detected by both sensors.

The obstacle detection unit 10 transmits information about the obstacle (obstacle information) including the relative position of the obstacle (the distance to the obstacle, the obstacle direction, etc.), the relative speed, and the size (width) of the obstacle, to the PCS-ECU 40.

Note that the obstacle detection unit 10 is connected with the PCS-ECU 40 to communicate with each other by a communication line (direct line) for one-to-one connection, an in-vehicle LAN, or the like. Also, if there are multiple obstacles, the obstacle detection unit 10 may transmit obstacle information about all obstacles, or may transmit obstacle information about an obstacle having the shortest distance to the vehicle 100 (namely, the obstacle having a highest emergency as a target of the drive support to avoid a collision).

Also, a part of functions in the obstacle detection unit 10 may be executed by a unit outside of the obstacle detection unit 10 (for example, the PCS-ECU 40). For example, the obstacle detection unit 10 may only execute detecting an object (transmitting a detection wave and receiving a reflected wave by the radar sensor, and/or capturing an image ahead of the vehicle 100 by the camera sensor), and other processing functions such as detecting (calculating) the relative position of the obstacle and the like may be executed by the PCS-ECU 40.

The vehicle speed sensor 20 is a known vehicle speed detection unit to detect the vehicle speed of the vehicle 100. The vehicle speed sensor 20 is connected with the PCS-ECU 40 to communicate with each other via an in-vehicle LAN or the like, to transmit a signal that corresponds to a detected vehicle speed (vehicle speed signal), to the PCS-ECU 40.

The acceleration/yaw rate sensor 30 is an in-vehicle sensor that is configured to have a known acceleration sensor and a yaw rate sensor contained in the same housing as a whole. Namely, the acceleration/yaw rate sensor 30 detects acceleration that operates on the vehicle 100, and a yaw rate of the vehicle 100 (rotational angular velocity around an axis passing through the center of gravity of the vehicle 100 in the up and down direction). The acceleration/yaw rate sensor 30 is disposed at a position about the center of gravity of the vehicle 100, in an aspect to be capable of detecting acceleration Gx of the vehicle 100 in the forward and backward direction, acceleration Gy in the left and right direction, acceleration Gz in the up and down direction, and a yaw rate γ. The acceleration/yaw rate sensor 30 is connected with the PCS-ECU 40 via a direct line, an in-vehicle LAN, or the like to communicate with each other, to transmit signals that correspond to the acceleration Gx to Gz (acceleration signals), and a signal that corresponds to the yaw rate (yaw rate signal) to the PCS-ECU 40.

The PCS-ECU 40 is an electronic control unit to execute a main control process in the forward PCS system 2. The PCS-ECU 40 may be configured with, for example, a microcomputer to execute various control processes by running various programs stored in a ROM, on a CPU.

Note that the PCS-ECU 40 is connected with the meter ECU 50, the brake ECU 60, and the like to communicate with each other via an in-vehicle LAN or the like.

The PCS-ECU 40 calculates a TTC (a time to collision or a collision time, referred to as the "forward TTC" below) that corresponds to a time (prediction time) expected to be passed until the vehicle 100 would collide with an obstacle in a circumstance where the obstacle is detected ahead of the vehicle 100 by the obstacle detection unit 10 (the calculation includes setting the TTC to a predetermined value). For example, based on obstacle information (the distance Df to the obstacle and the relative speed Vf of the obstacle) received from the obstacle detection unit 10, the PCS-ECU 40 calculates the forward TTC (=Df/Vf). Also, the PCS-ECU 40 may calculate the forward TTC, based on signals (acceleration signals and a yaw rate signal) and the like received from the acceleration/yaw rate sensor 30, considering a motional state of the vehicle 100. Specifically, by using acceleration and deceleration of the vehicle 100 in the forward and backward direction based on the acceleration signals, the PCS-ECU 40 may calculate the forward TTC, considering change of the relative relationship with an obstacle caused by the acceleration and deceleration of the vehicle 100 after having started calculating the forward TTC. Also, by using a turning radius of the vehicle 100 based on the yaw rate signal, the PCS-ECU 40 may determine whether it is possible to avoid a collision between the vehicle 100 and the obstacle by a steering operation by the driver, to calculate the forward TTC. Also, the PCS-ECU 40 may calculate the forward TTC, considering a history of obstacle information (a time series of past relative positions of the obstacle). Specifically, the PCS-ECU 40 may determine whether the vehicle 100 will collide with the obstacle, by estimating a movement trajectory of the obstacle until the vehicle 100 would collide with the obstacle, from the past movement trajectory of the obstacle calculated from the time series of past relative positions of the obstacle, to calculate the forward TTC.

Note that if determining that it is possible to avoid a collision between the vehicle 100 and the obstacle, by a steering operation by the driver, or by the estimated movement trajectory of the obstacle, the PCS-ECU 40 may set the forward TTC to, for example, a comparatively great value.

Also, based on the calculated forward TTC, the PCS-ECU 40 executes drive support to avoid a collision between the vehicle 100 and the obstacle detected by the obstacle detection unit 10 (alarming and automatic braking) in order. Namely, the PCS-ECU 40 determines from the forward TTC whether there is a likelihood of a collision between the vehicle 100 and the obstacle, and whether the likelihood is high or low, to start executing drive support to avoid a collision between the vehicle 100 and the obstacle, and to release the execution when appropriate. In the following, the drive support executed by the PCS-ECU 40 will be described.

Note that as a prerequisite to start executing the drive support (drive support execution condition), it is defined that the vehicle speed V of the vehicle 100 is greater than or equal to a predetermined lower limit speed Vlim. Namely, assuming that the vehicle speed V of the vehicle 100 based on the vehicle speed signal received from the vehicle speed sensor 20, is greater than or equal to the lower limit speed Vlim, the PCS-ECU 40 starts executing the drive support (alarming and automatic braking) following a predetermined condition which will be described later. By providing the drive support execution condition in this way, it is possible to suppress a situation in which unnecessary drive support is frequently started in a circumstance where the vehicle 100 travels at a comparatively low vehicle speed (vehicle speed V<Vlim) due to, for example, traffic congestion. More specifically, in a circumstance where the vehicle 100 travels at a comparatively low vehicle speed (for example, traveling in traffic congestion, or traveling through a very narrow road), there is a likelihood that a state frequently occurs where the vehicle 100 approaches a preceding vehicle ahead or a fixed object on a road, comparatively closer. Therefore, if adopting a configuration to start the drive support in such a circumstance, a situation may arise where unnecessary drive support is frequently started, which may give a sense of discomfort and troublesomeness to the driver. Therefore, by providing the lower limit speed Vlim with respect to the vehicle speed V of the vehicle 100 as the drive support execution condition, it is possible to suppress a situation in which unnecessary drive support is frequently started in a circumstance where the vehicle 100 travels at a comparatively low vehicle speed (vehicle speed V<Vlim).

First, if determining that there is a likelihood that the vehicle 100 collides with an obstacle, namely, if the forward TTC is less than or equal to a predetermined threshold TFon_th1, the PCS-ECU 40 starts alarming to warn the driver of the vehicle 100. Specifically, the PCS-ECU 40 transmits a request for an alarming operation to the meter ECU 50 and the brake ECU 60. Thus, the meter ECU 50 has the meter 52 display an alarm that there is a likelihood of a collision with an obstacle ahead of the vehicle 100, and the brake ECU 60 has the alarm buzzer 62 operate. Therefore, it is possible to make the driver of the vehicle 100 recognize that there is a likelihood of a collision with the obstacle.

Note that the alarming may be executed by a method other than sound (auditory stimulation) or display (visual stimulation), for example, may be executed by vibrating the seat of the vehicle 100.

Next, if determining that the likelihood is high for the vehicle 100 to collide with the obstacle, namely, if the forward TTC is less than or equal to a predetermined threshold TFon_th2 that is set less than the predetermined threshold TFon_th1, the PCS-ECU 40 generates a braking force of the vehicle 100 automatically (automatic braking). Specifically, the PCS-ECU 40 outputs a request for automatic braking to the brake ECU 60, and the brake ECU 60 controls the brake actuator 64 to generate the braking force of the vehicle 100 automatically. The braking force operating on the vehicle 100 by starting automatic braking, increases, for example, stepwise (for example, two stages) after the start of the automatic braking, and reaches a maximum value for avoiding a collision with the obstacle.

The drive support (alarming and automatic braking) by the PCS-ECU 40 is basically continued until the vehicle 100 is stopped by the automatic braking. However, if a preceding vehicle as the obstacle accelerates or changes the lane, or the vehicle 100 decelerates or changes the lane to avoid a collision between the vehicle 100 and the obstacle, execution of the drive support may be released.

Namely, if determining that the likelihood is eliminated for the vehicle 100 to collide with the obstacle after having started the alarming, namely, if the forward TTC is not less than or equal to a predetermined threshold TFoff_th1 (≥TFon_th1), the PCS-ECU 40 releases the execution of alarming. Specifically, the PCS-ECU 40 transmits a request for releasing the alarming to the meter ECU 50 and the brake ECU 60.

Note that it is desirable to have the predetermined threshold TFoff_th1 set to a value greater than the predetermined threshold TFon_th1 so that hunting, or frequent repetition of start and release of the alarming, can be prevented.

Also, if determining that it is out of a state where the likelihood is high for the vehicle 100 to collide with the obstacle after having started the automatic braking, namely, if the forward TTC is not less than or equal to a predetermined threshold TFoff_th2(≥TFon_th2), the PCS-ECU 40 releases the automatic braking. Specifically, the PCS-ECU 40 transmits a request for releasing the automatic braking to the brake ECU 60.

Note that it is desirable to have the predetermined threshold TFoff_th2 set to a value greater than the predetermined threshold TFon_th2 so that hunting, or frequent repetition of start and release of the alarming, can be prevented.

Also, if the obstacle is not detected any more by the obstacle detection unit 10, the PCS-ECU 40 releases the execution of the drive support (alarming and automatic braking).

Namely, the PCS-ECU 40 may determine whether there is a likelihood of a collision between the vehicle 100 and the obstacle, and whether the likelihood is high or low, by using not only the forward TTC, but also any method based on the relative position of the obstacle and the like. Namely, the PCS-ECU 40 may determine whether to start the drive support to avoid a collision, depending on a likelihood of the collision between the vehicle 100 and the obstacle, which is determined by any method based on the relative position of the obstacle and the like. For example, the PCS-ECU 40 may simply determine that the likelihood is high for a collision between the vehicle 100 and the obstacle, depending on whether the distance Df to the obstacle gets shorter. For such a case, the PCS-ECU 40 may adopt a configuration in which the drive support is executed if the distance Df to the obstacle is less than or equal to a predetermined distance set for the drive support (alarming and automatic braking).

Also, the PCS-ECU 40 is configured to be capable of executing a process to set (change) the volume of the alarm buzzer 62. Specifically, the PCS-ECU 40 transmits a request for changing (increasing or decreasing) the volume of the alarm buzzer 62 (a volume-up request or a volume-down request) to the brake ECU 60, and the brake ECU 60 transmits a setting signal to change the volume of the alarm buzzer 62.

The meter ECU 50 is an electronic control unit to control displaying on the meter 52. The meter ECU 50 may be configured with, for example, a microcomputer to execute various control processes by running various programs stored in a ROM, on a CPU.

In response to a request for an alarming operation received from the PCS-ECU 40, the meter ECU 50 transmits an alarm display signal to have the meter 52 display an alarm indicating that there is a likelihood of a collision with an obstacle ahead of the vehicle 100. Also, in response to a request for releasing the alarming received from the PCS-ECU 40, the meter ECU 50 transmits an alarm display release signal to stop displaying (not to display) the alarm.

The meter 52 is an indication unit (display unit) to display various vehicle states (the vehicle speed, the engine rotational speed, the shift range, etc.) and various information items, to indicate them to the driver of the vehicle 100. In response to an alarm display signal from the meter ECU 50, the meter 52 displays an alarm (a predetermined indicator, for example, a character, symbol, a figure, etc.) stating that there is a likelihood of a collision with an obstacle ahead of the vehicle 100. Also, if receiving an alarm display release signal from the PCS-ECU 40 while displaying the alarm, the meter 52 stops displaying (does not display) the alarm.

The brake ECU 60 is an electronic control unit that executes braking control in the vehicle 100 (or controls operational states of the brake apparatus in the vehicle 100). The brake ECU 60 controls, for example, the brake actuator 64 that makes hydraulic brake apparatuses operate, which are placed at wheels of the vehicle 100. The brake ECU 60 may be configured with, for example, a microcomputer to execute various control processes, by running various programs stored in a ROM, on a CPU.

Note that the brake ECU 60 is connected with the alarm buzzer 62, the brake actuator 64, and the like to communicate with each other via a direct line or an in-vehicle LAN or the like.

The brake ECU 60 may execute a control process to determine output (wheel cylinder pressure) of the brake actuator 64, usually in response to a braking operation by the driver. For example, the brake ECU 60 may set pressure of the master cylinder (master cylinder pressure) that corresponds to a braking operation, to be the output of the brake actuator 64 (wheel cylinder pressure).

Also, in response to a request for automatic braking received from the PCS-ECU 40, the brake ECU 60 executes a control process to generate a braking force of the vehicle 100 automatically, irrespective of a braking operation by the driver (automatic braking control). For example, the brake ECU 60 controls the brake actuator 64 to generate predetermined oil pressure irrespective of the master cylinder pressure, and to output the predetermined oil pressure, or pressure having the predetermined oil pressure added with the wheel cylinder pressure. Specifically, by controlling various valves, pumps, and the like included in the brake actuator 64, which will be described later, the brake ECU 60 has the brake actuator 64 generate the predetermined oil pressure, to output the predetermined oil pressure, or pressure having the predetermined oil pressure added with the wheel cylinder pressure. Also, if the vehicle 100 is an electrically driven vehicle, the brake ECU 60 may generate a braking force of the vehicle 100 automatically, by having the motor output (regenerative operation) controlled depending on a request for automatic braking from the PCS-ECU 40.

Also, in response to a request for an alarming operation and a request for releasing the alarming received from the PCS-ECU 40, the brake ECU 60 executes a process to operate the alarm buzzer 62, and a process to release the operation of the alarm buzzer 62, respectively. Specifically, in response to receiving a request for an alarming operation, the brake ECU 60 transmits an operation signal to the alarm buzzer 62, and in response to receiving a request for releasing the alarming, the brake ECU 60 transmits an operation release signal to the alarm buzzer 62.

Also, in response to a volume-up request or a volume-down request received from the PCS-ECU 40, the brake ECU 60 executes a process to change the volume setting of the alarm buzzer 62. Specifically, the brake ECU 60 transmits a setting signal to the alarm buzzer 62, to change the volume of the alarm buzzer 62.

Note that the PCS-ECU 40, the meter ECU 50, and the brake ECU 60 may be arbitrarily implemented by hardware, software, or firmware, or a combination of these as long as the functions described above can be implemented. Also, a part of or all of the functions of the PCS-ECU 40, the meter ECU 50, and the brake ECU 60 may be implemented by the other ECUs. For example, a part of or all of the functions of the brake ECU 60 may be implemented by the PCS-ECU 40, and a part of or all of the functions of the meter ECU 50 may be implemented by the PCS-ECU 40.

The alarm buzzer 62 is an alarm unit to alert the driver of the vehicle 100 that there is a likelihood of a collision. The alarm buzzer 62 operates in response to an operation signal received from the brake ECU 60, to make a predetermined buzzer sound. Also, if receiving an operation release signal from the brake ECU 60 during the operation (buzzing), the alarm buzzer 62 stops the operation (stops making the predetermined buzzer sound). Also, the alarm buzzer 62 is configured to be capable of changing the volume in two stages, for example, "normal" and "high" (having a greater volume than "normal") depending on a setting signal from the brake ECU 60.

Note that the volume of the alarm buzzer 62 may be changed in a greater number of stages (three stages or more), or may be changed continuously. Also, the alarm buzzer 62 is an example of an alarm unit to execute alarming by sound. For example, alarming may be executed through a loud-speaker built in the vehicle compartment of the vehicle 100, by producing a speech sound stating that there is a likelihood for the vehicle 100 to collide with an obstacle.

The brake actuator 64 is a unit to generate output that makes the brake apparatus (for example, the hydraulic brake apparatus described above) operate in the vehicle 100. The brake actuator 64 may include, for example, a pump (including a motor to drive the pump) to generate high oil pressure, various valves, and a hydraulic circuit, and may have any configuration as long as the output can be raised (for example, boosting the wheel cylinder pressure) irrespective of an amount of a brake operation by the driver. Typically, the brake actuator 64 may include a high oil pressure source other than the master cylinder (a pump or an accumulator to generate comparatively high oil pressure), or may adopt a configuration that is used for a brake-by-wire system represented by an ECB (electronically controlled braking system).

Figure 4:
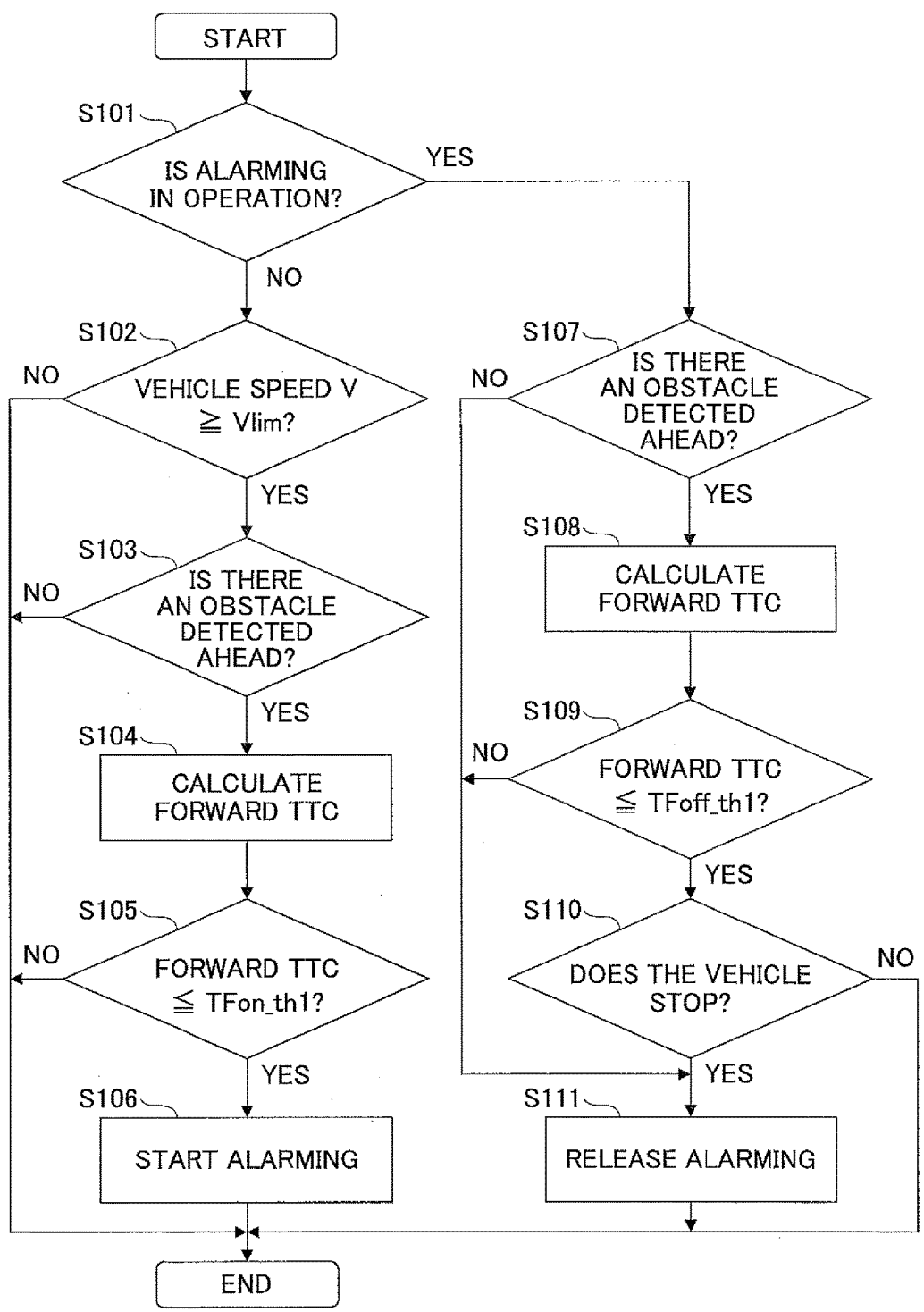
FIG. 4 is a flowchart that schematically illustrates an example of an alarm start process and a release process by a collision avoidance apparatus (forward PCS system).
Figure 5:
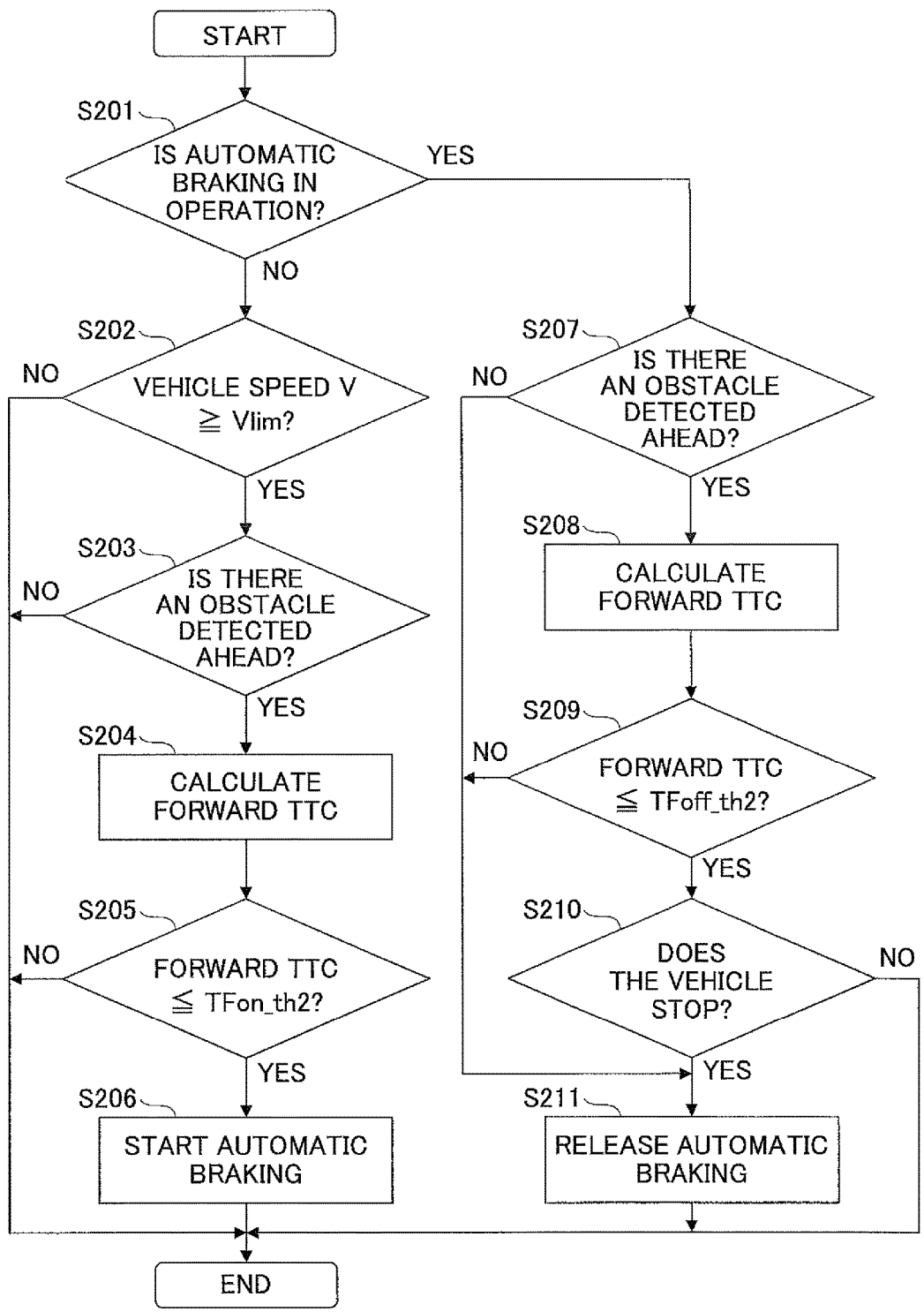
FIG. 5 is a flowchart that schematically illustrates an example of an automatic braking start process and a release process by a collision avoidance apparatus (forward PCS system)

Here, FIGS. 4 and 5 are flowcharts that schematically illustrate examples of processes to start the drive support to avoid a collision with an obstacle ahead of the vehicle 100 (drive support start processes) and processes to release the drive support (release processes) by the collision avoidance apparatus 1 (forward PCS system 2) according to the present embodiment. FIG. 4 is a flowchart that schematically illustrates an example of an alarm start process and a release process by the collision avoidance apparatus 1 (forward PCS system 2) according to the present embodiment. FIG. 5 is a flowchart that schematically illustrates an example of an automatic braking start process and a release process by the collision avoidance apparatus 1 (forward PCS system 2) according to the present embodiment.

Note that processes corresponding to the flowcharts illustrated in FIGS. 4 and 5 are executed at predetermined intervals from an ignition on (IG-ON) to an ignition off (IG-OFF) of the vehicle 100.

First, the alarm start process and the release process will be described using FIG. 4.

Note that as will be described later, Steps S102 to S106 correspond to the alarm start process, and Steps S107 to S111 correspond to the alarm release process.

At Step S101, the PCS-ECU 40 determines whether the alarming is in operation. If the alarming is not in operation, the PCS-ECU 40 goes forward to Step S102; or if the alarming is in operation, the PCS-ECU 40 goes forward to Step S107.

At Step S102, the PCS-ECU 40 determines whether the vehicle speed V of the vehicle 100 based on a vehicle speed signal received from the vehicle speed sensor 20, is greater than or equal to the lower limit speed Vlim. If the vehicle speed V of the vehicle 100 is greater than or equal to the lower limit speed Vlim, the PCS-ECU 40 goes forward to Step S103; or if the vehicle speed V of the vehicle 100 is not greater than or equal to the lower limit speed Vlim, the PCS-ECU 40 terminates the current process.

At Step S103, the PCS-ECU 40 determines whether an obstacle is detected ahead of the vehicle 100, by the obstacle detection unit 10. If an obstacle is detected ahead of the vehicle 100, the PCS-ECU 40 goes forward to Step S104; or if an obstacle is not detected ahead of the vehicle 100, the PCS-ECU 40 terminates the current process.

At Step S104, the PCS-ECU 40 calculates a forward TTC based on obstacle information received from the obstacle detection unit 10.

At Step S105, the PCS-ECU 40 determines whether the calculated forward TTC is less than or equal to the predetermined threshold TFon_th1. If the calculated forward TTC is less than or equal to the predetermined threshold TFon_th1, the PCS-ECU 40 goes forward to Step S106; or if the calculated forward TTC is not less than or equal to the predetermined threshold TFon_th1, the PCS-ECU 40 terminates the current process.

At Step S106, the PCS-ECU 40 starts alarming to warn the driver of the vehicle 100. Namely, the PCS-ECU 40 transmits a request for an alarming operation to the meter ECU 50 and the brake ECU 60.

On the other hand, at Step S107, the PCS-ECU 40 determines whether an obstacle is detected ahead of the vehicle 100, by the obstacle detection unit 10. If an obstacle is detected ahead of the vehicle 100, the PCS-ECU 40 goes forward to Step S108; or if an obstacle is not detected ahead of the vehicle 100, the PCS-ECU 40 goes forward to Step S111.

At Step S108, the PCS-ECU 40 calculates a forward TTC based on obstacle information received from the obstacle detection unit 10.

At Step S109, the PCS-ECU 40 determines whether the calculated forward TTC is less than or equal to the predetermined threshold TFoff_th1. If the calculated forward TTC is less than or equal to the predetermined threshold TFoff_th1, the PCS-ECU 40 goes forward to Step S110; or if the calculated forward TTC is not less than or equal to the predetermined threshold TFoff_th1, the PCS-ECU 40 goes forward to Step S111.

At Step S110, the PCS-ECU 40 determines whether the vehicle 100 is stopped, based on a vehicle speed signal received from the vehicle speed sensor 20. If the vehicle 100 is stopped, the PCS-ECU 40 goes forward to Step S111; or if the vehicle 100 is not stopped, the PCS-ECU 40 terminates the current process.

At Step S111, the PCS-ECU 40 releases the alarming. Namely, the PCS-ECU 40 transmits a request for releasing the alarming to the meter ECU 50 and the brake ECU 60.

Next, the automatic braking start process and the release process will be described using FIG. 5.

Note that as will be described later, Steps S202 to S206 correspond to the automatic braking start process, and Steps S207 to S211 correspond to the automatic braking release process.

At Step S201, the PCS-ECU 40 determines whether the automatic braking is in operation. If the automatic braking is not in operation, the PCS-ECU 40 goes forward to Step S202; or if the automatic braking is in operation, the PCS-ECU 40 goes forward to Step S207.

At Step S202, the PCS-ECU 40 determines whether the vehicle speed V of the vehicle 100 based on a vehicle speed signal received from the vehicle speed sensor 20, is greater than or equal to the lower limit speed Vlim. If the vehicle speed V of the vehicle 100 is greater than or equal to the lower limit speed Vlim, the PCS-ECU 40 goes forward to Step S203; or if the vehicle speed V of the vehicle 100 is not greater than or equal to the lower limit speed Vlim, the PCS-ECU 40 terminates the current process.

At Step S203, the PCS-ECU 40 determines whether an obstacle is detected ahead of the vehicle 100, by the obstacle detection unit 10. If an obstacle is detected ahead of the vehicle 100, the PCS-ECU 40 goes forward to Step S204; or if an obstacle is not detected ahead of the vehicle 100, the PCS-ECU 40 terminates the current process.

At Step S204, the PCS-ECU 40 calculates a forward TTC based on obstacle information received from the obstacle detection unit 10.

At Step S205, the PCS-ECU 40 determines whether the calculated forward TTC is less than or equal to the predetermined threshold TFon_th2. If the calculated forward TTC is less than or equal to the predetermined threshold TFon_th2, the PCS-ECU 40 goes forward to Step S206; or if the calculated forward TTC is not less than or equal to the predetermined threshold TFon_th2, the PCS-ECU 40 terminates the current process.

At Step S206, the PCS-ECU 40 starts the automatic braking. Namely, the PCS-ECU 40 transmits a request for automatic braking to the brake ECU 60.

On the other hand, at Step S207, the PCS-ECU 40 determines whether an obstacle is detected ahead of the vehicle 100 by the obstacle detection unit 10. If an obstacle is detected ahead of the vehicle 100, the PCS-ECU 40 goes forward to Step S208; or if an obstacle is not detected ahead of the vehicle 100, the PCS-ECU 40 goes forward to Step S211.

At Step S208, the PCS-ECU 40 calculates a forward TTC based on obstacle information received from the obstacle detection unit 10.

At Step S209, the PCS-ECU 40 determines whether the calculated forward TTC is less than or equal to the predetermined threshold TFoff_th2. If the calculated forward TTC is less than or equal to the predetermined threshold TFoff_th2, the PCS-ECU 40 goes forward to Step S210; or if the calculated forward TTC is not less than or equal to the predetermined threshold TFoff_th2, the PCS-ECU 40 goes forward to Step S211.

At Step S210, the PCS-ECU 40 determines whether the vehicle 100 is stopped, based on a vehicle speed signal received from the vehicle speed sensor 20. If the vehicle 100 is stopped, the PCS-ECU 40 goes forward to Step S211; or if the vehicle 100 is not stopped, the PCS-ECU 40 terminates the current process.

At Step S211, the PCS-ECU 40 releases the automatic braking. Namely, the PCS-ECU 40 transmits a request for releasing the automatic braking to the meter ECU 50 and the brake ECU 60.

Note that if the vehicle 100 is stopped by the automatic braking, the PCS-ECU 40 executes a process to hold a braking force to maintain the stoppage of the vehicle 100 for a certain amount of time (brake holding). Specifically, the PCS-ECU 40 transmits a request for brake holding to the brake ECU 60, to have the brake ECU 60 generate the braking force to maintain the stoppage of the vehicle 100 via the brake actuator 64.

Referring to FIGS. 1 to 3 again, if determining that there is a likelihood for the vehicle 100 to collide with an object such as a following vehicle approaching from behind (simply referred to as an "approaching object" below), the backward FHL system 3 has a hazard lamp 80 blink (backward FHL) to avoid a collision. Specifically, as illustrated in FIG. 2, if determining that there is a likelihood for the vehicle 100 to collide with an approaching object behind the vehicle 100 (a following vehicle 200 in the figure) by a BSM (Blind Spot Monitoring) radar 70, the backward FHL system 3 drives the hazard lamp 80 via the meter ECU 50, namely, the hazard lamp 80 blinks. Thus, it is possible to call attention of an approaching object such as a following vehicle, and to prompt the driver of the following vehicle to perform a driving operation to avoid a collision (changing the lane change or braking).

Also, as illustrated in FIG. 2, in addition to having the hazard lamp 80 blink (operation of the backward FHL), the backward FHL system 3 has the meter 52 display that the backward FHL is in operation (for example, a display 54D of "backward FHL in operation"). Thus, the driver of the vehicle 100 can recognize that the backward FHL is in operation, namely, that there is a likelihood for the vehicle 10 to collide with an approaching object coming from behind.

In the following, the BSM radar 70, the hazard lamp 80, the meter ECU 50, and the meter 52 included in the backward FHL system 3, will be described in detail.

The BSM radar 70 is an approaching object detection unit to detect a following vehicle approaching the vehicle 100 from behind, or a vehicle approaching the vehicle 100 from side-behind while traveling on an adjacent lane. Specifically, the BSM radar 70 detects an object positioned in the rear or the side-rear of the vehicle 100, by transmitting a detection wave (for example, a millimeter wave in a 26 GHz band) in a predetermined range covering the rear and the side-rear of the vehicle 100, and receiving a reflected wave that corresponds to the detection wave. Also, the BSM radar 70 detects (calculates) the distance to the obstacle based on a time elapsed between transmission of a detection wave and reception of a reflected wave corresponding to the detection wave, and detects (calculates) the orientation of the obstacle with respect to the vehicle 100 by phase differences of reflected waves from the obstacle received by multiple antennas. Namely, the BSM radar 70 detects (calculates) the relative position (distance and direction) of the object with respect to the vehicle 100. Also, the BSM radar 70 detects (calculates) the relative speed of the object with respect to the vehicle 100, based on a difference between the frequency of a transmitted detection wave and the frequency of a received reflected wave. Also, the BSM radar 70 detects (calculates) the size (width) of the approaching object based on reflected waves received in multiple directions. The BSM radar 70 includes the BSM radars 70L and 70R as illustrated in FIG. 3.

As illustrated in FIG. 3, the BSM radar 70L is built in, for example, the rear bumper or the like on the left side of a rear end part of the vehicle 100, and is configured to transmit a detection wave to a predetermined range AL backward and left backward of the vehicle 100, to be capable of detecting an approaching object that approaches the vehicle 100 in the predetermined range AL.

As illustrated in FIG. 3, the BSM radar 70R is built in, for example, the rear bumper or the like on the right side of a rear end part of the vehicle 100, and is configured to transmit a detection wave to a predetermined range AR backward and right backward of the vehicle 100, to be capable of detecting an approaching object that approaches the vehicle 100 in the predetermined range AR.

Note that the predetermined ranges AL and AR in FIG. 3 schematically designate ranges in which an approaching object can be detected by the BSM radars 70L and 70R (detection ranges), respectively, which may be different from actual detection ranges.

The BSM radar 70 (70L and 70R) includes an approaching object detection unit 71 and a collision detection unit 72 as illustrated in FIG. 1.

Note that the approaching object detection unit 71 and the collision detection unit 72 include the approaching object detection units 71L and 71R, and the collision detection units 72L and 72R, corresponding to the BSM radars 70L and 70R, respectively.

The approaching object detection unit 71 (71L and 71R) detects an approaching object that approaches the vehicle 100 from behind (including left backward and right backward). Specifically, the approaching object detection unit 71 determines whether an object detected behind the vehicle 100 is an approaching object. Namely, if the relative speed of a detected object indicates a state where it approaches the vehicle 100 (for example, if the relative speed of the detected object is greater than or equal to a positive predetermined speed, assuming that a direction approaching the vehicle 100 is the positive direction), the approaching object detection unit 71 determines that the detected object is an approaching object.

The collision detection unit 72 (72L and 72R) determines whether there is a likelihood for the vehicle 100 to collide with an approaching object that approaches the vehicle 100 from behind (including left backward or right backward). The collision detection unit 72 calculates, for example, a TTC (referred to as the "backward TTC" below) that corresponds to a time (prediction time) to be passed until the vehicle 100 would collide with an obstacle (the calculation includes setting the TTC to a predetermined value). Then, based on the calculated backward TTC, the collision detection unit 72 determines whether there is a likelihood for the vehicle 100 to collide with the approaching object. Specifically, if the backward TTC is less than or equal to a predetermined threshold TRon_th, the collision detection unit 72 determines that there is a likelihood for the vehicle 100 to collide with the approaching object. If determining that there is a likelihood for the vehicle 100 to collide with the approaching object, the collision detection unit 72 transmits a request for a backward FHL operation to the meter ECU 50, and transmits an indication of the backward FHL operation to the PCS-ECU 40.

Note that the predetermined threshold TRon_th is set in advance based on an experiment or a computer simulation, as a value with which it is possible to determine that there is a likelihood for the vehicle 100 to collide with an approaching object. Also, in response to receiving the indication of the backward FHL operation, the PCS-ECU 40 increments (+1) a backward FHL state flag that has been set to "0" as the initial value at an IG-ON timing of the vehicle 100. Thus, if the backward FHL state flag is greater than or equal to "1", the PCS-ECU 40 can determine that the backward FHL is in operation, namely, there is a likelihood for the vehicle 100 to collide with an approaching object coming from behind.

Also, during an operation of the backward FHL (after the request for a backward FHL operation has been transmitted), if an approaching object is not detected any more that has been approaching the vehicle 100 from behind, or the backward TTC is not less than or equal to a predetermined threshold TRoff_th(≥TRon_th), the collision detection unit 72 determines that the likelihood has been eliminated for the vehicle 100 to collide with the approaching object coming from behind. If determining that the likelihood has been eliminated for the vehicle 100 to collide with the approaching object coming from behind, the collision detection unit 72 transmits a request for releasing the backward FHL to the meter ECU 50, and transmits an indication of the backward FHL release to the PCS-ECU 40.

Note that it is desirable to have the predetermined threshold TRoff_th set to a value greater than the predetermined threshold TRon_th so that hunting, or frequent repetition of start and release of the backward FHL operation can be prevented. Also, in response to receiving the indication of the backward FHL release from the ESM radar 70 (the collision detection unit 72), the PCS-ECU 40 decrements (−1) the backward FHL state flag. Thus, if the backward FHL state flag is "0", the PCS-ECU 40 can determine that the backward FHL is not in operation, namely, there is no likelihood for the vehicle 100 to collide with an approaching object coming from behind.

The collision detection unit 72 (72L and 72R) may calculate a backward TTC (=Dr/Vr) based on the distance Dr from the vehicle 100 to an approaching object (simply referred to as the "distance to the approaching object"), and the relative speed Vr of the obstacle with respect to the vehicle 100 (simply referred to as the "relative speed of the approaching object" below). Also, the collision detection unit 72 may calculate the backward TTC, considering a driving operation (a steering operation for changing the lane or an acceleration operation to accelerate). Namely, the collision detection unit 72 may determine whether a collision can be avoided by a current driving operation with respect to the relative position and the relative speed of the approaching object, to calculate the backward TTC. Also, the collision detection unit 72 may calculate the backward TTC, considering a time series of past relative positions and relative speed of the approaching object with respect to the vehicle 100. Specifically, the collision detection unit 72 may determine whether the vehicle 100 will collide with the approaching object, by estimating a movement trajectory of the approaching object until the vehicle 100 would collide with the approaching object from a past movement trajectory of the approaching object calculated from the time series of past relative positions of the approaching object, to calculate the backward TTC.

Note that if determining that it is possible to avoid a collision between the vehicle 100 and the approaching object, by a steering operation by the driver, or by the estimated movement trajectory of the approaching object, the PCS-ECU 40 may set the backward TTC to, for example, a comparatively great value.

Also, the collision detection unit 72 may determine whether there is a likelihood of a collision between the vehicle 100 and the approaching object, by using not only the backward TTC, but also any method based on the relative position of the approaching object and the like. For example, the collision detection unit 72 may simply determine that there is a likelihood of a collision between the vehicle 100 and the approaching object, if the distance to the approaching object is less than or equal to a predetermined distance (with which it is possible to determine that there is a likelihood of a collision, based on an experiment or a simulation). Also, the collision detection unit 72 may determine whether a collision can be avoided by a current driving operation (an acceleration operation to accelerate or a steering operation for changing the lane) with respect to the relative position and the relative speed of the approaching object; and if a collision cannot be avoided, may determine that there is a likelihood for the approaching object to collide with the vehicle 100. Also, the collision detection unit 72 may determine whether there is a likelihood for the approaching object to collide with the vehicle 100, by estimating a movement trajectory of the approaching object until the vehicle 100 would collide with the approaching object from the past movement trajectory of the approaching object calculated from the time series of past relative positions of the approaching object.

Also, a part of functions in the BSM radar 70 may be executed by a unit outside of the BSM radar 70 (for example, the meter ECU 50). For example, the functions of the approaching object detection unit 71 and the collision detection unit 72 in the BSM radar 70 may be executed by an external processing unit such as the meter ECU 50.

The meter ECU 50 and the meter 52 execute the following functions in the backward FHL system 3 in addition to the predetermined functions in the forward PCS system 2 described above.

The meter ECU 50 is connected with the BSM radar 70 (70L and 70R) via a direct line, an in-vehicle LAN, or the like, to communicate with each other, and controls the operational state of the hazard lamp 80 in response to a request for a backward FHL operation and a request for releasing the backward FHL received from the collision detection unit 72 (72L and 72R). For example, the meter ECU 50 increments (+1) the backward FHL operation flag, which has been set to "0" as the initial value at an IG-ON timing of the vehicle 100, if receiving a request for a backward FHL operation from one of the collision detection units 72L and 72R, or decrement (−1) it if receiving a request for releasing the backward FHL. Then, if the backward FHL operation flag changes from "0" to "1" or greater, the meter ECU 50 transmits an operation signal to the hazard lamp 80 to have the hazard lamp 80 blink. Also, if the backward FHL operation flag changes from "1" or greater to "0", the meter ECU 50 transmits an operation release signal to the hazard lamp 80 to stop the hazard lamp 80 from blinking.

Also, in response to a request for a backward FHL operation and a request for releasing the backward FHL received from the collision detection unit 72, the meter ECU 50 similarly controls a display state (to display or not to display) to indicate whether the backward FHL is in operation in the meter 52. For example, if the backward FHL operation flag changes from "0" to "1" or greater, the meter ECU 50 transmits a backward FHL display signal to the meter 52 to display that the backward FHL is in operation. Also, if the backward FHL operation flag changes from "1" or greater to "0", the meter ECU 50 transmits a backward FHL display release signal to the meter 52 to stop displaying (not to display) that the backward FHL is in operation.

The hazard lamp 80 is an indicator lamp that functions using a pair of blinker lamps (lamps that blink by a blinker switch) disposed at left and right on a rear end part of the vehicle 100. The hazard lamp 80 includes a drive relay (not illustrated), by which a blink state and a non-blink state are switched. The hazard lamp 80 is connected with the meter ECU 50 via a direct line, an in-vehicle LAN, or the like to communicate with each other, and blinks by a drive relay operation in response to an operation signal from the meter ECU 50.

Note that the hazard lamp 80 in the present embodiment includes that disposed on a rear end part of the vehicle 100 described above, and may or may not include that disposed on a front end part of the vehicle 100.

In response to a backward FHL display signal from the meter ECU 50, the meter 52 displays that the backward FHL is in operation, and in response to a backward FHL display release signal from the meter ECU 50, stops displaying (does not display) that the backward FHL is in operation.

Figure 6:
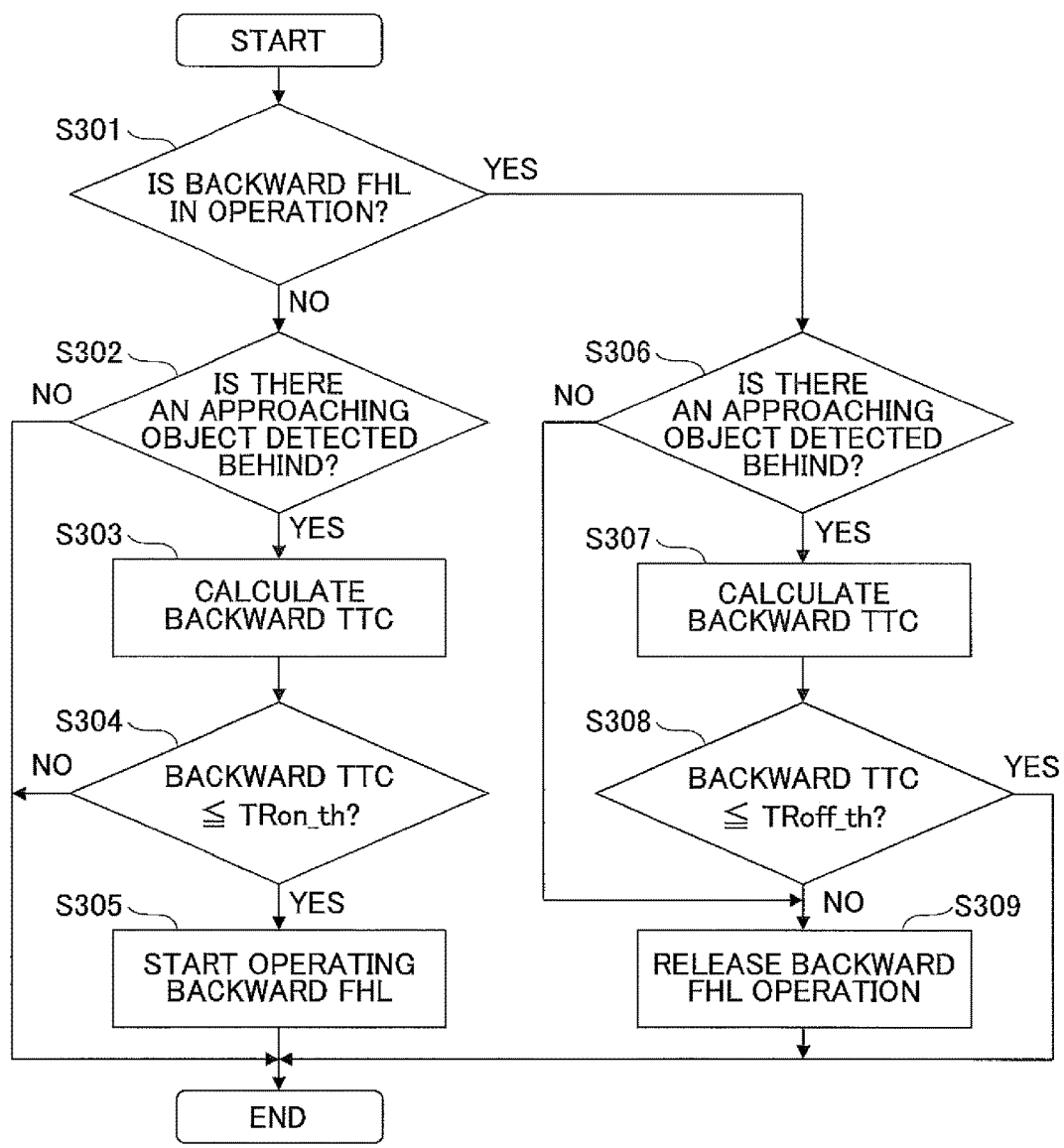
FIG. 6 is a flowchart that schematically illustrates an example of a backward FHL operation start process and an operation release process by a collision avoidance apparatus (backward FHL system)

Here, FIG. 6 is a flowchart that schematically illustrates an example of a backward FHL operation start process and an operation release process by the collision avoidance apparatus 1 (backward FHL system 3).

Note that a process corresponding to the flowchart is executed by each of the BSM radars 70L and 70R (the collision detection units 72L and 72R). Also, the process is executed at predetermined intervals from an ignition on (IG-ON) to an ignition off (IG-OFF) of the vehicle 100. Also, as will be described later, Steps S302 to S305 in this process correspond to the backward FHL operation start process, and Steps S306 to S309 correspond to the backward FHL operation release process.

At Step S301, the collision detection unit 72 (72L or 72R) determines whether the backward FHL is in operation. If the backward FHL is not in operation, the collision detection unit 72 (72L or 72R) goes forward to Step S302; or if the backward FHL is in operation, the collision detection unit 72 (72L or 72R) goes forward to Step S306.

At Step S302, the collision detection unit 72 (72L or 72R) determines whether an approaching object is detected that approaches the vehicle 100 from behind. If an approaching object is detected that approaches the vehicle 100 from behind, the collision detection unit 72 (72L or 72R) goes forward to Step S303; or if an approaching object is not detected that approaches the vehicle 100 from behind, the collision detection unit 72 (72L or 72R) terminates the current process.

At Step S303, the collision detection unit (72L or 72R) calculates a backward TTC.

At Step S304, the collision detection unit (72L or 72R) determines whether the calculated backward TTC is less than or equal to the predetermined threshold TRon_th. If the calculated backward TTC is less than or equal to the predetermined threshold TRon_th, the collision detection unit 72 (72L or 72R) goes forward to Step S305; or if the calculated backward TTC is not less than or equal to the predetermined threshold TRon_th, the collision detection unit 72 (72L or 72R) terminates the current process.

At Step S305, the collision detection unit 72 (72L or 72R) starts a backward FHL operation. Namely, the collision detection unit 72 (72L or 72R) transmits a request for a backward FHL operation to the meter ECU 50, and transmits an indication of the backward FHL operation to the PCS-ECU 40.

On the other hand, at Step S306, the collision detection unit 72 (72L or 72R) determines whether an approaching object is detected that approaches the vehicle 100 from behind. If an approaching object is detected that approaches the vehicle 100 from behind, the collision detection unit 72 (72L or 72R) goes forward to Step S307; or if an approaching object is not detected that approaches the vehicle 100 from behind, the collision detection unit 72 (72L or 72R) goes forward to Step S309.

At Step S307, the collision detection unit 72 (72L or 72R) calculates a backward TTC.

At Step S308, the collision detection unit 72 (72L or 72R) determines whether the calculated backward TTC is less than or equal to the predetermined threshold TRoff_th. If the calculated backward TTC is less than or equal to the predetermined threshold TRoff_th, the collision detection unit 72 (72L or 72R) terminates the current process; or if the calculated backward TTC is not less than or equal to the predetermined threshold TRon_th, the collision detection unit 72 (72L or 72R) goes forward to Step S309.

At Step S309, the collision detection unit 72 (72L or 72R) releases the backward FHL operation. Namely, the collision detection unit 72 (72L or 72R) transmits a request for releasing the backward FHL to the meter ECU 50, and transmits an indication of the backward FHL release to the PCS-ECU 40.

Next, a characteristic process by the collision avoidance apparatus 1 (forward PCS system 2) according to the present embodiment, namely, a process executed corresponding to a backward FHL operation (a process that corresponds to backward FHL operation) will be described in detail.

Figure 7:
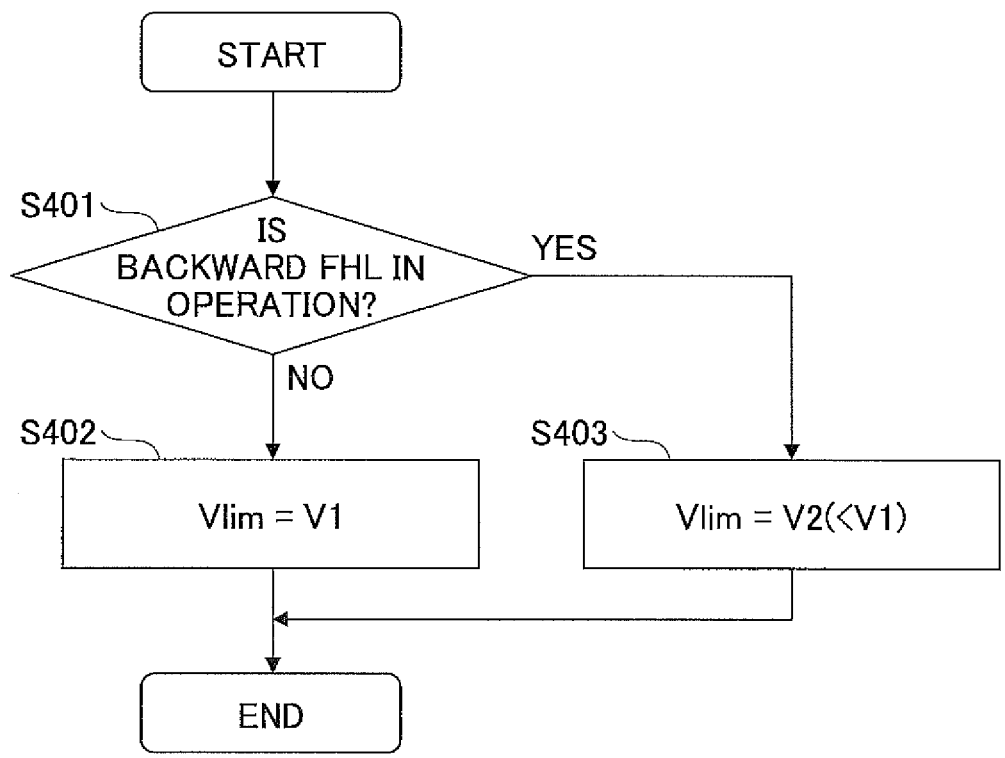
FIG. 7 is a flowchart that schematically illustrates an example of a process corresponding to a backward FHL operation by a collision avoidance apparatus (forward PCS system) according to a first embodiment.

FIG. 7 is a flowchart that schematically illustrates an example of the process corresponding to a backward FHL operation by the collision avoidance apparatus 1 (forward PCS system 2) according to the present embodiment.

Note that a process corresponding to the flowchart is executed at predetermined intervals from an ignition on (IG-ON) to an ignition off (IG-OFF) of the vehicle 100. Also, at a start timing of the process (IG-ON timing of the vehicle 100), the lower limit speed Vlim is set to a predetermined value V1 (>0).

At Step S401, the PCS-ECU 40 determines whether the backward FHL is in operation, namely, the backward FHL state flag is greater than or equal to "1". If the backward FHL state flag is not greater than or equal to "1" (is "0"), the PCS-ECU 40 goes forward to Step S402; or if the backward FHL state flag is greater than or equal to "1", the PCS-ECU 40 goes forward to Step S403.

At Step S402, the PCS-ECU 40 sets the lower limit speed Vlim to the predetermined value V1 (if it has been already set to the predetermined value V1, the lower limit speed Vlim is maintained at the predetermined value V1).

On the other hand, at Step S403, the PCS-ECU 40 sets the lower limit speed Vlim to a predetermined value V2. If it has been already set to the predetermined value V2, the lower limit speed Vlim is maintained at the predetermined value V2.

Note that the predetermined value V2 satisfies a relationship of 0≤V2<V1.

In this way, if the backward FHL is in operation, the collision avoidance apparatus 1 according to the present embodiment sets the lower limit speed Vlim, which corresponds to the drive support start condition, less than in a case where the backward FHL is not in operation. Namely, if determining that there is a likelihood for the vehicle 100 to collide with an approaching object coming from behind, the collision avoidance apparatus 1 sets the lower limit speed Vlim less than in a case where there is not such a likelihood. Thus, it is possible to execute the drive support at an appropriate timing in a circumstance where the vehicle 100 travels at a comparatively low vehicle speed, and the vehicle is pushed forward and accelerated, due to a collision with a following vehicle from behind and the like, while avoiding frequently executing unnecessary drive support.

Specifically, if an approaching object coming from behind collides with the vehicle 100 from behind, there is a likelihood that the vehicle 100 is pushed forward and accelerated, and approaches an obstacle ahead. Therefore, it is desirable to start the drive support even earlier, for example, if the vehicle 100 is struck from behind in a circumstance where the vehicle 100 travels at a comparatively low vehicle speed (V<V1), or stops. Thus, if determining that there is a likelihood for the vehicle 100 to collide with an approaching object coming from behind, the collision avoidance apparatus 1 sets the lower limit speed Vlim less than in a case where there is not such a likelihood (Vlim=V2<V1). This makes it possible to start the drive support at an appropriate timing if the vehicle 100 is struck from behind and accelerated forward because the drive support execution condition is satisfied comparatively earlier.

The predetermined value V2 may be set appropriately. For example, if it is possible for the vehicle 100 to travel by creeping, V2 may be set greater than a value that corresponds to the vehicle speed at a start timing of creeping. Thus, for example, if releasing a brake operation to shorten an inter-vehicle distance relative to a stopped preceding vehicle in traffic congestion or the like, it is possible to prevent the drive support of the alarming and automatic braking, from operating unnecessarily even if the backward FHL is in operation.

Note that, in the present embodiment, "setting the lower limit speed Vlim less" includes a case where the predetermined value V2 is 0, namely, setting the lower limit speed Vlim to 0 from the predetermined value V1 (>0).

Also, in the present embodiment, the lower limit speed Vlim is changed in two stages depending on whether there is a likelihood that an approaching object coming from behind collides with the vehicle 100. Furthermore, the lower limit speed Vlim may be changed in a greater number of stages or continuously, by determining whether the likelihood of a collision is high or low. Namely, the collision avoidance apparatus 1 according to the present embodiment may set the lower limit speed Vlim lower stepwise or continuously if the likelihood is higher for an approaching object coming from behind to collide with the vehicle 100. For example, the lower limit speed Vlim is set lower stepwise, starting from the predetermined value V2 (>0) while the likelihood is higher in a state where it is determined that there is a likelihood of a collision, and the lower limit speed Vlim is set to the predetermined value V1 that represents no likelihood of a collision. Then, if the likelihood is greater than or equal to a predetermined level (for example, a level at which it is determined that the collision is inevitable), the lower limit speed Vlim is set to 0. Thus, in a circumstance where the vehicle 100 travels at a comparatively low vehicle speed, it is possible to keep a fine balance between suppressing a situation in which unnecessary drive support is frequently started, and executing the drive support at an appropriate timing in a circumstance in which the vehicle 100 is accelerated forward due to a rear-end collision or the like. In this case, the BSM radar 70 transmits information about an approaching object including the relative position, the relative speed and the backward TTC of the approaching object (approaching object information) to the PCS-ECU 40. Based on the received approaching object information, the PCS-ECU 40 determines whether the likelihood is high or low for the approaching object to collide with the vehicle 100. Also, the BSM radar 70 (the collision detection unit 72) may determine whether there is a likelihood that the approaching object will collide with the vehicle 100, as well as whether the likelihood is high or low, to transmit information about the determination to the PCS-ECU 40.

Note that stating that "the likelihood of a collision is higher" includes a state transitioned from a state having no likelihood of a collision to a state having a likelihood of a collision, and the same is applied for embodiments described later. Also, whether the likelihood is high or low may be determined based on the backward TTC (if it is less, the likelihood of a collision is higher) and the distance to an approaching object (if it is shorter, the likelihood of a collision is higher), and the same is applied for embodiments described later.

Modified Example

Next, a modified example of the first embodiment will be described.

The modified example adopts a configuration in which the drive support is started irrespective of whether the vehicle speed V is greater than or equal to the lower limit speed Vlim (the drive support execution condition).

Figure 8:
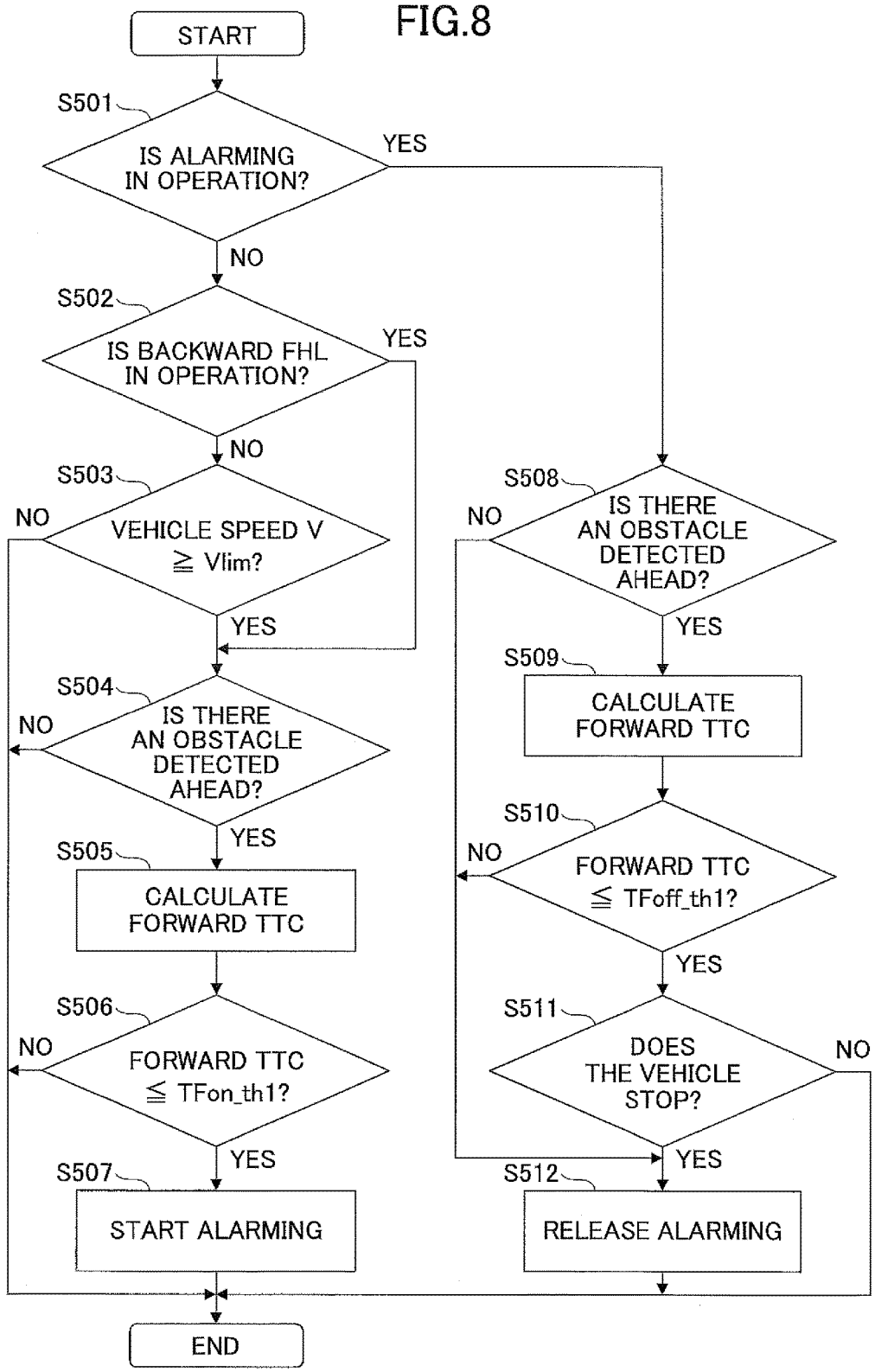
FIG. 8 is a flowchart that schematically illustrates an example of an alarm start process and a release process by a collision avoidance apparatus (forward PCS system) according to a modified example of the first embodiment.
Figure 9:
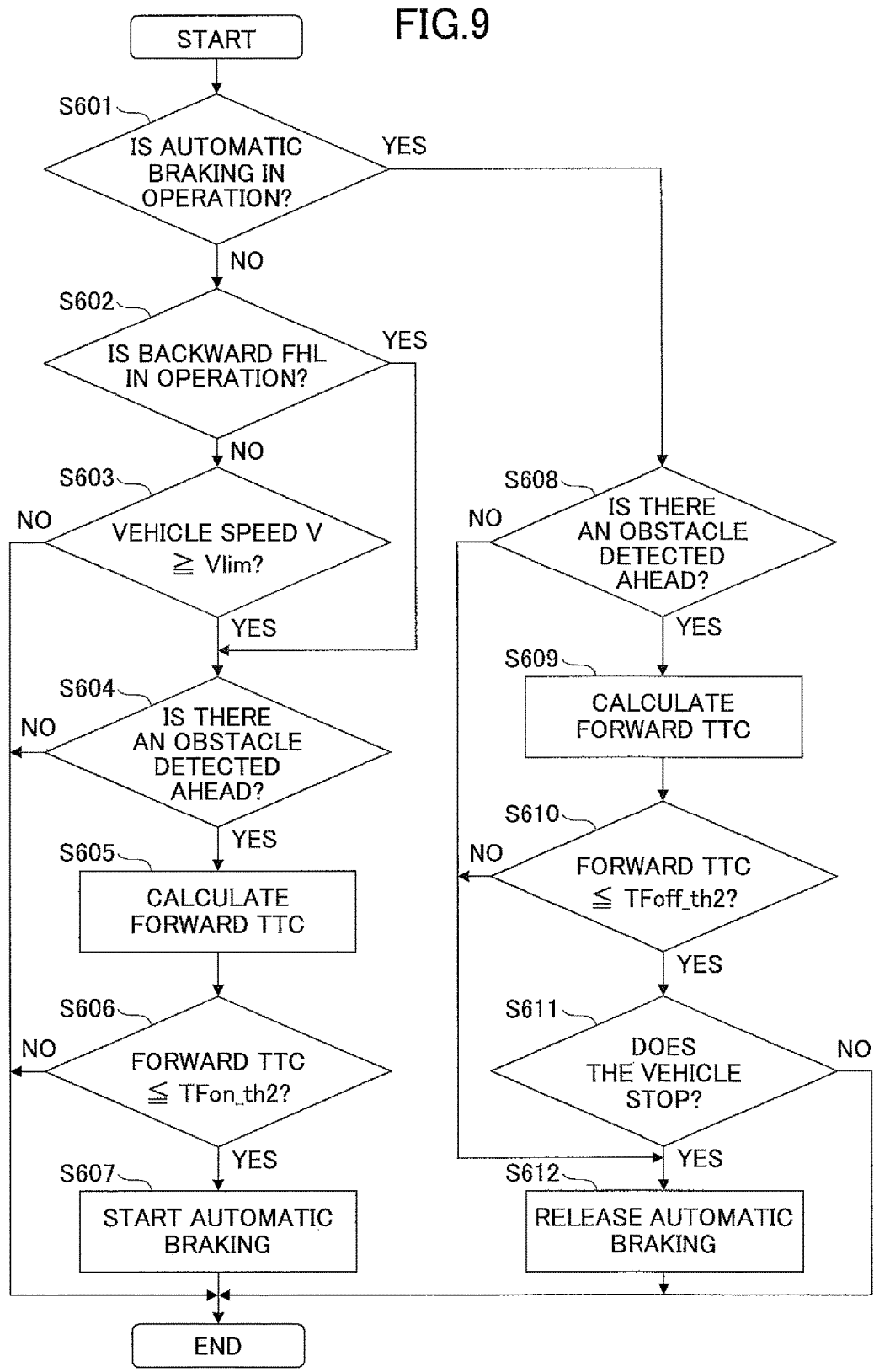
FIG. 9 is a flowchart that schematically illustrates an example of an automatic braking start process and a release process by a collision avoidance apparatus (forward PCS system) according to a modified example of the first embodiment.

FIGS. 8 and 9 are flowcharts that schematically illustrate examples of alarm start processes and release processes by the collision avoidance apparatus 1 (forward PCS system 2) according to the modified example. FIG. 8 is a flowchart that schematically illustrates an example of an alarm start process and a release process by the collision avoidance apparatus 1 (forward PCS system 2) according to the modified example. FIG. 9 is a flowchart that schematically illustrates an example of an automatic braking start process and a release process by the collision avoidance apparatus (forward PCS system 2) according to the modified example.

Note that processes corresponding to the flowcharts illustrated in FIGS. 8 and 9 are executed at predetermined intervals from an ignition on (IG-ON) to an ignition off (IG-OFF) of the vehicle 100.

First, the alarm start process and the release process will be described using FIG. 8.

Note that Steps S502 to S507 correspond to the alarm start process, and Steps S508 to S512 correspond to the alarm release process. Also, Step S501, Steps S503 to S507, and Steps S508 to S512 in FIG. 8 are the same as Step S101, Steps S102 to S106, and Steps S107 to S111 in FIG. 4 described above, and different steps will be mainly described.

At Step S502, the PCS-ECU 40 determines whether the backward FHL is in operation, namely, the backward FHL state flag is greater than or equal to "1". If the backward FHL state flag is not greater than or equal to "1" (is "0"), the PCS-ECU 40 goes forward to Step S503 to determine the drive support execution condition. On the other hand, if the backward FHL state flag is greater than or equal to "1", the PCS-ECU 40 skips Step S503 that determines the drive support execution condition, and executes Steps S504 and after.

Next, the automatic braking start process and the release process will be described using FIG. 9.

Note that Steps S602 to S607 correspond to the automatic braking start process, and S608 to S612 correspond to the automatic braking release process. Also, Step S601, Steps S603 to S607, and Steps S608 to S612 in FIG. 9 are the same as Step S201, Steps S202 to S206, and Steps S207 to S211 in FIG. 5 described above, and different steps will be mainly described.

At Step S602, the PCS-ECU 40 determines whether the backward FHL is in operation, namely, the backward FHL state flag is greater than or equal to "1". If the backward FHL state flag is not greater than or equal to "1" (is "0"), the PCS-ECU 40 goes forward to Step S603 to determine the drive support execution condition. On the other hand, if the backward FHL state flag is greater than or equal to "1", the PCS-ECU 40 skips Step S603 that determines the drive support execution condition, and executes Steps S604 and after.

In this way, in the modified example, while the backward FHL is in operation, if the forward TTC is less than or equal to the predetermined threshold TFon_th1, irrespective of the drive support execution condition, alarming is started to warn the driver of the vehicle 100. Namely, once it is determined that there is a likelihood for the vehicle 100 to collide with an approaching object coming from behind, even if the vehicle speed V of the vehicle 100 is not greater than or equal to the lower limit speed Vlim, alarming is started for the driver of the vehicle 100 as long as the forward TTC is less than or equal to the predetermined threshold TFon_th1. Also, in the modified example, while the backward FHL is in operation, if the forward TTC is less than or equal to the predetermined threshold TFon_th2, irrespective of the drive support execution condition, automatic braking is started. Namely, once it is determined that there is a likelihood for the vehicle 100 to collide with an approaching object coming from behind, even if the vehicle speed V of the vehicle 100 is not greater than or equal to the lower limit speed Vlim, alarming is started to warn the driver of the vehicle 100 as long as the forward TTC is less than or equal to the predetermined threshold TFon_th2. Thus, if an approaching object coming from behind collides with the vehicle 100 from behind, the drive support such as alarming and automatic braking can be securely started.

Note that the collision avoidance apparatus 1 may be implemented that realizes both the embodiment illustrated in FIG. 7 (including FIGS. 3-4), and the embodiment illustrated in FIGS. 8-9 described above. For example, if a function relating to the embodiment illustrated in FIG. 7 is not implemented due to an occurrence of a program error or the like, a function relating to the embodiment illustrated in FIGS. 8-9 is implemented. Thus, a failsafe function can be realized when a program error or the like occurs.

Second Embodiment

Next, a second embodiment will be described.

In addition to contents according to the first embodiment, a collision avoidance apparatus 1 according to the present embodiment further executes a process corresponding to a backward FHL operation. In the following, the same elements as in the first embodiment are assigned the same codes, and different parts will be mainly described.

Figure 10:
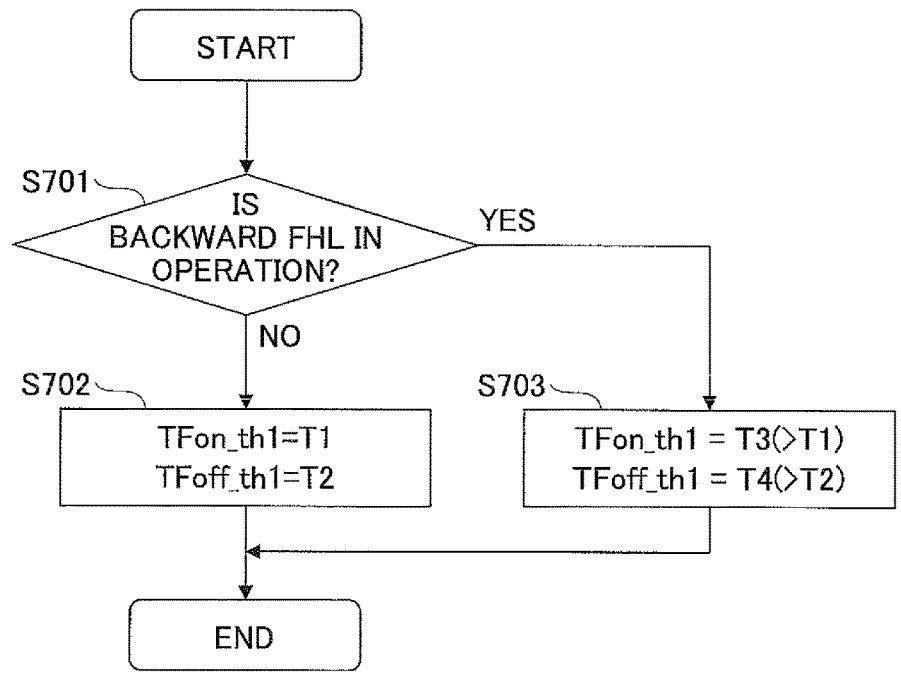
FIG. 10 is a flowchart that schematically illustrates an example of a process corresponding to a backward FHL operation by a collision avoidance apparatus (forward PCS system) according to a second embodiment.

FIG. 10 is a flowchart that schematically illustrates an example of a process corresponding to a backward FHL operation by the collision avoidance apparatus 1 (forward PCS system 2) according to the present embodiment.

Note that a process corresponding to the flowchart is executed at predetermined intervals from an ignition on (IG-ON) to an ignition off (IG-OFF) of the vehicle 100. Also, at a start timing of the process (IG-ON timing of the vehicle 100), the predetermined thresholds TFon_th1 and TFoff_th1 are set to the predetermined values T1 and T2, respectively. Also, the predetermined values T1 and T2 satisfy a relationship of $0<T1\leq T2$.

At Step S701, the PCS-ECU 40 determines whether the backward FHL is in operation, namely, the backward FHL state flag is greater than or equal to "1". If the backward FHL state flag is not greater than or equal to "1" (is "0"), the PCS-ECU 40 goes forward to Step S702; or if the backward FHL state flag is greater than or equal to "1", the PCS-ECU 40 goes forward to Step S703.

At Step S702, the PCS-ECU 40 sets the predetermined thresholds TFon_th1 and TFoff_th1 to the predetermined values T1 and T2, respectively. If they have been already set to the predetermined values T1 and T2, the predetermined thresholds TFon_th1 and TFoff_th1 are maintained to be the predetermined values T1 and T2, respectively.

At Step S703, the PCS-ECU 40 sets the predetermined thresholds TFon_th1 and TFoff_th1, to predetermined values T3 (>T1) and T4 (>T2), respectively. If they have been already set to the predetermined values T3 and T4, the predetermined thresholds TFon_th1 and TFoff_th1 are maintained to be the predetermined values T3 and T4, respectively.

Note that the predetermined values T3 and T4 satisfy a relationship of $0<T3\leq T4$.

In this way, if the backward FHL is in operation, the collision avoidance apparatus 1 according to the present embodiment sets the predetermined threshold TFon_th1 greater than in a case where the backward FHL is not in operation (brings the start timing of alarming forward). Namely, if determining that there is a likelihood for the vehicle 100 to collide with an approaching object coming from behind, the collision avoidance apparatus 1 sets the predetermined threshold TFon_th1 greater than in a case where the backward FHL is not in operation (brings the start timing of alarming forward). Thus, in a circumstance where a following vehicle or the like approaches the vehicle 100 from behind, which may collide with the vehicle 100, and the driver of the vehicle 100 needs to avoid a collision with an obstacle ahead of the vehicle 100, the driver of the vehicle 100 can avoid a collision with the obstacle more appropriately by a braking operation.

Specifically, in a circumstance where a following vehicle or the like approaches the vehicle 100 from behind, which may collide with the vehicle 100, it is highly likely that the driver of the vehicle 100 keeps an eye on the following vehicle behind the vehicle 100, by a rearview mirror or the like. Also, in the present embodiment, if the backward FHL starts operating, the meter 52 displays that the backward FHL is in operation. Therefore, a likelihood is higher that the driver of the vehicle 100 also keeps an eye on the display. Therefore, in this circumstance, there is a likelihood that the driver does not pay sufficient attention to an obstacle ahead of the vehicle 100, and consequently, a braking operation may be too late to avoid a collision with the obstacle ahead of the vehicle 100. Therefore, if determining that there is a likelihood for the vehicle 100 to collide with an approaching object coming from behind, the collision avoidance apparatus 1 brings the start timing of alarming earlier than in a case where there is not such a likelihood. Thus, the driver can recognize by the alarm that there is a likelihood that the vehicle 100 collides with an obstacle ahead, and hence, can execute a braking operation to avoid a collision appropriately even in this circumstance.

Note that in the present embodiment, the predetermined threshold TFon_th1 is changed in two stages depending on whether there is a likelihood that an approaching object coming from behind collides with the vehicle 100. Furthermore, it may be changed in a greater number of stages or continuously, by determining whether the likelihood is high or low. Namely, the collision avoidance apparatus 1 according to the present embodiment may set the predetermined threshold TFon_th1 higher stepwise or continuously if the likelihood is higher for an approaching object coming from behind to collide with the vehicle 100. For example, the predetermined threshold TFon_th1 is set higher stepwise, up to the predetermined value T3 while the likelihood is higher in a state where it is determined that there is a likelihood of a collision, and the predetermined threshold TFon_th1 is set to the predetermined value T1 that represents no likelihood of a collision. In this case, if the likelihood is greater than or equal to a predetermined level (for example, a level at which it is determined that the collision is inevitable), the predetermined threshold TFon_th1 is set to T3. Thus, it is possible to keep a fine balance between having the driver perform a braking operation to avoid a collision appropriately, and suppressing a sense of discomfort and troublesomeness felt by the driver due to alarming started at an earlier timing.

Third Embodiment

Next, a third embodiment will be described.

Similar to the second embodiment, in addition to contents according to the first embodiment, a collision avoidance apparatus 1 according to the present embodiment further executes a process corresponding to a backward FHL operation. In the following, the same elements as in the first embodiment are assigned the same codes, and different parts will be mainly described.

Figure 11:
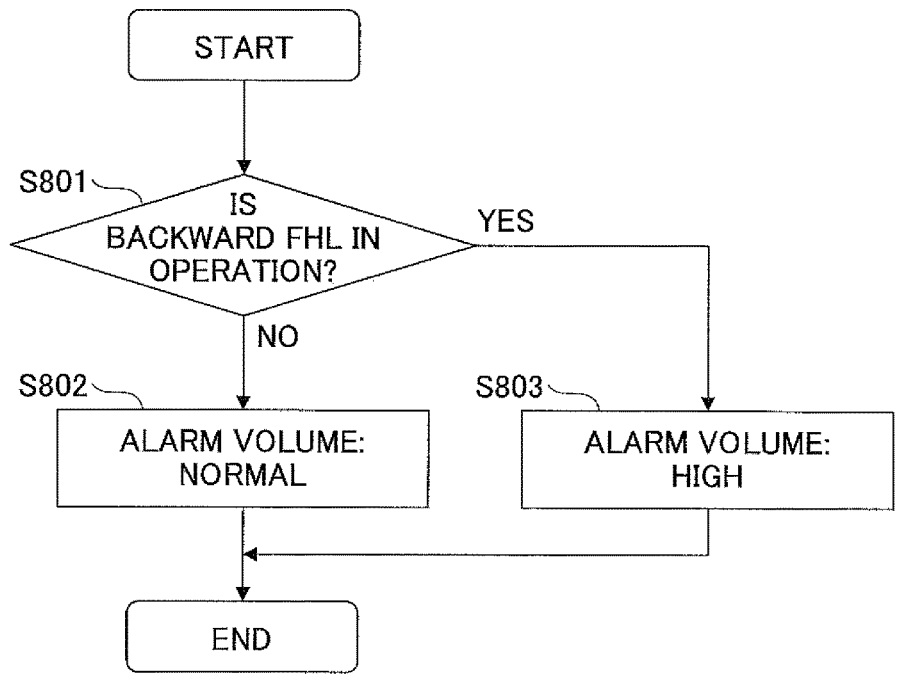
FIG. 11 is a flowchart that schematically illustrates an example of a process corresponding to a backward FHL operation by a collision avoidance apparatus (forward PCS system) according to a third embodiment.

FIG. 11 is a flowchart that schematically illustrates an example of a process corresponding to a backward FHL operation by the collision avoidance apparatus 1 (forward PCS system 2) according to the present embodiment.

Note that a process corresponding to the flowchart is executed at predetermined intervals from an ignition on (IG-ON) to an ignition off (IG-OFF) of the vehicle 100. Also, at a start timing of the process (IG-ON timing of the vehicle 100), the volume of the alarm buzzer 62 is set to "normal".

At Step S801, the PCS-ECU 40 determines whether the backward FHL is in operation, namely, the backward FHL state flag is greater than or equal to "1". If the backward FHL state flag is not greater than or equal to "1" (is "0"), the PCS-ECU 40 goes forward to Step S802; or if the backward FHL state flag is greater than or equal to "1", the PCS-ECU 40 goes forward to Step S803.

At Step S802, the PCS-ECU 40 sets the volume of the alarm buzzer 62 to "normal". If it has been already set to "normal", the volume of the alarm buzzer 62 is maintained to "normal".

At Step S803, the PCS-ECU 40 sets the volume of the alarm buzzer 62 to "high". If it has been already set to "high", the volume of the alarm buzzer 62 is maintained to "high".

In this way, if the backward FHL is in operation, the collision avoidance apparatus 1 according to the present embodiment sets the volume of the alarm buzzer 62 higher than in a case where the backward FHL is not in operation (makes the volume of the alarm by sound louder). Namely, if determining that there is a likelihood for the vehicle 100 to collide with an approaching object coming from behind, the collision avoidance apparatus 1 sets the volume of the alarm buzzer 62 higher than in a case where the backward FHL is not in operation (makes the volume of the alarm by sound louder). Thus, in a circumstance where a following vehicle or the like approaches the vehicle 100 from behind, which may collide with the vehicle 100, and the driver of the vehicle 100 needs to avoid a collision with an obstacle ahead of the vehicle 100, the driver of the vehicle 100 can avoid a collision with the obstacle more appropriately by a braking operation.

Specifically, as described above, in a circumstance where a following vehicle or the like approaches the vehicle 100 from behind, which may collide with the vehicle 100, it is highly likely that the driver of the vehicle 100 keeps an eye on the following vehicle behind the vehicle 100, by a rearview mirror or the like. Therefore, in this circumstance, there is a likelihood that the driver pays too much attention to the following vehicle to notice that the alarming has been started, and consequently, a braking operation may be too late to avoid a collision with the obstacle ahead of the vehicle 100. Therefore, if determining that there is a likelihood for the vehicle 100 to collide with an approaching object coming from behind, the collision avoidance apparatus 1 makes the volume of the alarm louder than in a case where there is not such a likelihood. Thus, the driver can notice more easily that there is a likelihood that the vehicle 100 collides with an obstacle ahead, and hence, can execute a braking operation to avoid a collision appropriately even in this circumstance.

Note that in the present embodiment, the volume of the alarm (the alarm buzzer 62) by sound is changed in two stages depending on whether there is a likelihood that an approaching object coming from behind collides with the vehicle 100. Furthermore, it may be changed in a greater number of stages or continuously, by determining whether the likelihood is high or low. Namely, the collision avoidance apparatus 1 according to the present embodiment may set the volume of the alarm (the alarm buzzer 62) by sound higher stepwise or continuously while the likelihood is higher for an approaching object coming from behind to collide with the vehicle 100. Thus, it is possible to keep a fine balance between having the driver perform a braking operation to avoid a collision appropriately, and suppressing a sense of discomfort and troublesomeness felt by the driver due to alarming with a louder sound volume.

The embodiments of the present invention have been described in detail. Note that the present invention is not limited to the above specific embodiments, but various changes, substitutions, and alterations could be made without departing from the spirit and scope of the present invention.

For example, the second or third embodiment illustrated in FIG. 10 or FIG. 11 may be implemented by itself without being combined with contents of the first embodiment including the modified example (the embodiment illustrated in FIG. 7 and the embodiment illustrated in FIGS. 8-9). Also, the second and third embodiments illustrated in FIG. 10 and FIG. 11 may be combined.

Also, as an approaching object detection unit, any object detection unit may be used instead of the BSM radar 70, or along with the BSM radar 70. For example, a known camera sensor may be used, or a laser radar may be used that uses a light wave (laser) as a detection wave.

Also, in the above embodiments, although two BSM radars (the BSM radars 70L and 70R) are provided as an approaching object detection unit, the number of radars may be one, or three or more as long as an approaching object can be appropriately detected that approaches the vehicle 100 from behind.

The invention claimed is:

1. A collision avoidance apparatus for a vehicle, the apparatus comprising:
   an obstacle detection unit that includes a first sensor configured to detect an obstacle positioned ahead of the vehicle;
   an approaching object detection unit that includes a second sensor configured to detect an approaching object approaching the vehicle from behind the vehicle; and
   an electronic control unit configured to:
   (i) calculate a collision time until the vehicle collides with the obstacle detected by the first sensor, based on a distance between the vehicle and the obstacle, and a relative speed of the obstacle with respect to the vehicle; and
   (ii) execute a drive support to avoid the collision between the vehicle and the obstacle based on the collision time, and to start the drive support when (1) a vehicle speed of the vehicle is greater than or equal to a predetermined lower limit speed and (2) the collision time is less than or equal to a predetermined threshold;
   wherein the electronic control unit executes at least one of
   (a) lowering the lower limit speed when it has been determined, based on an output of the second sensor, that a likelihood exists for the approaching object to collide with the vehicle from behind the vehicle, and
   (b) starting the drive support when it has been determined that the likelihood exists for the approaching object to collide with the vehicle from behind the vehicle, and the collision time is less than or equal to the predetermined threshold, even when the vehicle speed of the vehicle is less than the predetermined lower limit speed.

2. The collision avoidance apparatus as claimed in claim 1, wherein
   the drive support includes automatic braking to generate a braking force of the vehicle,
   the predetermined threshold includes a predetermined braking threshold for conducting the automatic braking, and
   the electronic control unit starts the automatic braking when the vehicle speed is greater than or equal to the lower limit speed, and the collision time is less than or equal to the predetermined braking threshold for the automatic braking.

3. The collision avoidance apparatus as claimed in claim 2, wherein
   the drive support includes alarming to warn a driver of the vehicle about the obstacle,
   the predetermined threshold includes a predetermined alarming threshold for conducting the alarming, the predetermined alarming threshold being greater than the predetermined braking threshold, and
   the electronic control unit increases the predetermined alarming threshold when the likelihood increases for the approaching object to collide with the vehicle from behind the vehicle, and starts the alarming when the vehicle speed is greater than or equal to the lower limit speed, and the collision time is less than or equal to the predetermined alarming threshold.

4. The collision avoidance apparatus as claimed in claim 3, wherein the alarming warns the driver of the vehicle by a sound, and the electronic control unit increases a volume of the sound of the alarming when the likelihood increases for the approaching object to collide with the vehicle from behind, and starts the alarming by the sound when the vehicle speed is greater than or equal to the lower limit speed, and the collision time is less than or equal to the predetermined alarming threshold.

5. The collision avoidance apparatus as claimed in claim 2, wherein the drive support includes alarming to warn a driver of the vehicle about the obstacle by a sound, the predetermined threshold includes a predetermined alarming threshold for conducting the alarming by the sound, the predetermined alarming threshold being greater than the predetermined braking threshold, and the electronic control unit increases a volume of the sound of the alarming when the likelihood increases for the approaching object to collide with the vehicle from behind the vehicle, and starts the alarming by the sound when the vehicle speed is greater than or equal to the lower limit speed, and the collision time is less than or equal to the predetermined alarming threshold.

6. The collision avoidance apparatus as claimed in claim 1, wherein the drive support includes alarming to warn a driver of the vehicle about the obstacle, the predetermined threshold includes a predetermined alarming threshold for conducting the alarming, and the electronic control unit increases the predetermined alarming threshold when the likelihood increases for the approaching object to collide with the vehicle from behind the vehicle, and starts the alarming when the vehicle speed is greater than or equal to the lower limit speed, and the collision time is less than or equal to the predetermined alarming threshold.

7. The collision avoidance apparatus as claimed in claim 6, wherein the alarming warns the driver of the vehicle by a sound, and the electronic control unit increases a volume of the sound of the alarming when the likelihood increases for the approaching object to collide with the vehicle from behind, and starts the alarming by the sound when the vehicle speed is greater than or equal to the lower limit speed, and the collision time is less than or equal to the predetermined alarming threshold.

8. The collision avoidance apparatus as claimed in claim 1, wherein the drive support includes alarming to warn a driver of the vehicle about the obstacle by a sound, the predetermined threshold includes a predetermined alarming threshold for conducting the alarming by the sound, and the electronic control unit increases a volume of the sound of the alarming when the likelihood increases for the approaching object to collide with the vehicle from behind the vehicle, and starts the alarming by the sound when the vehicle speed is greater than or equal to the lower limit speed, and the collision time is less than or equal to the predetermined alarming threshold.

* * * * *